US008918307B2

(12) United States Patent
Brown et al.

(10) Patent No.: US 8,918,307 B2
(45) Date of Patent: Dec. 23, 2014

(54) AUTOMATED SYSTEM LATENCY DETECTION FOR FABRIC SIMULATION

(75) Inventors: Aaron Ches Brown, Austin, TX (US); Jeff Jerome Frankeny, Austin, TX (US); James Kai Hsu, Austin, TX (US); Glenn Owen Kincaid, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 12/402,588

(22) Filed: Mar. 12, 2009

(65) Prior Publication Data

US 2010/0235158 A1 Sep. 16, 2010

(51) Int. Cl.
| | |
|---|---|
| G06F 9/455 | (2006.01) |
| G01R 31/08 | (2006.01) |
| G06F 11/00 | (2006.01) |
| G08C 15/00 | (2006.01) |
| H04J 1/16 | (2006.01) |
| H04L 1/00 | (2006.01) |
| H04L 12/26 | (2006.01) |
| G06F 21/60 | (2013.01) |
| G06F 17/50 | (2006.01) |
| H04W 24/06 | (2009.01) |
| H04W 24/08 | (2009.01) |

(52) U.S. Cl.
CPC ........... *G06F 17/5031* (2013.01); *H04W 24/06* (2013.01); *G06F 21/604* (2013.01); *H04W 24/08* (2013.01); *H04L 43/50* (2013.01); *G06F 2217/84* (2013.01)
USPC ............................................ 703/25; 370/252

(58) Field of Classification Search
CPC .... G06F 21/604; H04W 24/08; H04W 24/06; H04W 43/50

USPC ............................................ 703/25; 370/252
See application file for complete search history.

(56) References Cited

U.S. PATENT DOCUMENTS

| | | | |
|---|---|---|---|
| 6,643,714 B1 * | 11/2003 | Chrysanthakopoulos | ........ 710/8 |
| 6,977,908 B2 | 12/2005 | de Azevedo et al. | .......... 370/254 |
| 7,010,607 B1 | 3/2006 | Bunton | .......... 709/228 |
| 7,020,697 B1 | 3/2006 | Goodman et al. | ............ 709/223 |
| 7,738,403 B2 | 6/2010 | Ottamalika et al. | .......... 370/255 |
| 2003/0097438 A1 | 5/2003 | Bearden et al. | ............... 709/224 |
| 2004/0025018 A1 * | 2/2004 | Haas et al. | .................... 713/168 |
| 2005/0210454 A1 | 9/2005 | DeWitt, Jr. et al. | ........... 717/133 |

(Continued)

OTHER PUBLICATIONS

Antonio Robles-Gomez, "Implementing the Advanced Switching Fabric Discovery Process", IEEE 2007.*

(Continued)

*Primary Examiner* — Omar Fernandez Rivas
*Assistant Examiner* — Angel Calle
(74) *Attorney, Agent, or Firm* — VanLeeuwen & VanLeeuwen; William J. Stock

(57) ABSTRACT

A configuration manager identifies a first device and a second device within a simulated system. Each device within the simulated system includes an inbound port and an outbound port. Next, the configuration manager injects a simulation only packet, at an "outbound time," on the first device's outbound port and detects that the second device's inbound port receives the simulation only packet at an "inbound time." As such, the configuration manager identifies a direct connection between the first device and the second device and computes a latency time for the connection. In turn, the configuration manager configures one or more first device configuration registers and one or more second device configuration registers based upon the computed latency time.

14 Claims, 16 Drawing Sheets

(56) References Cited

U.S. PATENT DOCUMENTS

| | | | |
|---|---|---|---|
| 2005/0228531 A1 | 10/2005 | Genovker et al. | 700/130 |
| 2006/0239271 A1* | 10/2006 | Khasnabish et al. | 370/395.21 |
| 2007/0223388 A1* | 9/2007 | Arad et al. | 370/252 |
| 2007/0271082 A1 | 11/2007 | Dominguez et al. | 703/20 |
| 2008/0080400 A1 | 4/2008 | Kapoor et al. | 370/255 |
| 2010/0235156 A1* | 9/2010 | Brown et al. | 703/13 |

OTHER PUBLICATIONS

Chapter 5, "Chapter 5, Network Layer", Oct. 26, 2004, http://homepages.ius.edu/rwisman/b438/html/chapter5.htm.*

Protocols, NPL "Fine-Tuning Voice over Packet Services", Jan 4, 2009.*

Barker et al.; "On the feasibility of Optical Circuit Switching for High Performance Computing Systems," IEEE/ACM Digital Library, 2005.

Eberle et al., "Separated High-bandwidth and Low-latency Communication in the Cluster Internconnect Clint," IEEE/ACM Digital Library, 2002.

Chaudhuri, M. et al., "SMTp: An Architecture for Next-Generation Scalable Multi-Threading," IEEE/ACM Digital Library, 2005.

Mukherjee, R. et al.; "Verification of an Industrial CC-NUMA Server," IEEE/ACM Digital.

Office action for U.S. Appl. No. 12/420,650, mailed Jun. 24, 2011, 32 pages.

Herkersdorf et al., "Route Discovery for Multistage Fabrics in ATM switching Nodes," Performance Evaluation, vol. 22, Issue 3, May 1995, pp. 221-238.

Notice of Allowance for U.S. Appl. No. 12/402,650 (Brown et al., "Automated Simulation Fabric Discovery and Configuration," filed Mar. 12, 2009), U.S. Patent and Trademark Office, mailed Mar. 30, 2012, 20 pages.

Notice of Allowance for U.S. Appl. No. 12/402,650 (Brown et al., "Automated Simualtion Fabric Discovery and Configuration," filed Mar. 12, 2009), U.S. Patent and Trademark Office, mailed Jun. 21, 2012, 18 pages.

* cited by examiner

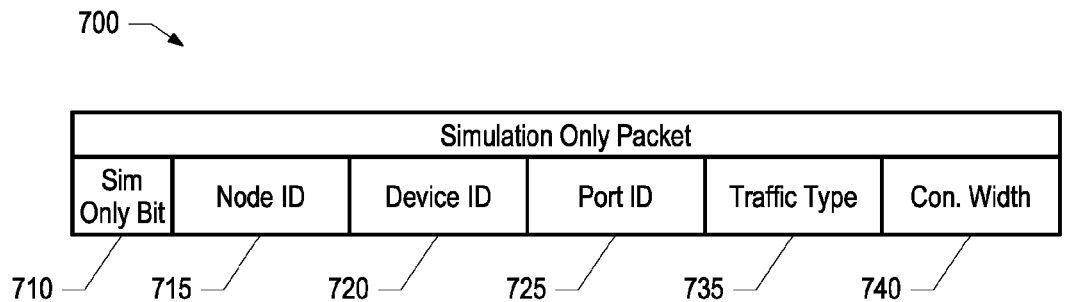
FIG. 7A
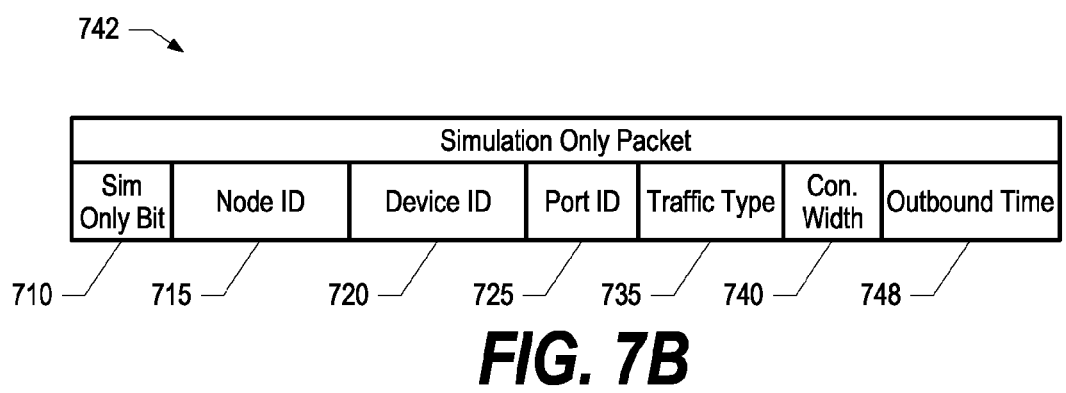
FIG. 7B
FIG. 7C

800 →

| Connection Table (Direct Connections) | | | | | | |
|---|---|---|---|---|---|---|
| Sending Port | Dest. Port | Traffic Type | Con. Width | Aggregate Bit | Outbound Time | Inbound Time |
| N0.D0.A | | | | | 01245 | |
| N0.D0.A | N1.D0.B | D | 4 | | | 01250 |
| N0.D0.X | | | | | 01347 | |
| N0.D0.X | N0.D1.X | C/D | 8 | | | 01380 |
| N1.D0.Y | | | | | 01476 | |
| N1.D0.Y | N1.D1.Z | C | 4 | | | 01520 |

| Connection Table (Direct Connections and Indirect Connections) | | | | | | | | |
|---|---|---|---|---|---|---|---|---|
| Sending Port | Dest. Port | Latency Time | Hop 1 In | Hop 1 Out | Hop 1 Valid | Hop 2 In | Hop 2 Out | Hop 2 Valid |
| N0.D0.A | N1.D0.B | 005 | | | | | | |
| N1.D0.B | N0.D0.A | 005 | | | | | | |
| N0.D0.X | N0.D1.X | 033 | | | | | | |
| N0.D1.X | N0.D0.X | 033 | | | | | | |
| N1.D0.Y | N1.D1.Z | 044 | | | | | | |
| N1.D1.Z | N1.D0.Y | 044 | | | | | | |
| N0.D0.A | N1.D1.Z | 049 | N1.D0.B | N1.D0.Y | 1 | | | |
| N0.D1.X | N1.D1.Z | 082 | N0.D0.X | N0.D0.A | 1 | N1.D0.B | N1.D0.Y | 1 |

AUTOMATED SYSTEM LATENCY DETECTION FOR FABRIC SIMULATION

GOVERNMENT RIGHTS

This invention was made with United States Government support under Agreement No. HR0011-07-9-002 awarded by DARPA. The Government has certain rights in the invention.

BACKGROUND OF THE INVENTION

1. Technical Field

The present invention relates to injecting and detecting simulation only packets within a simulation environment during a connection discovery process in order to automatically compute connection latency times and program interconnect configuration registers accordingly.

2. Description of the Related Art

A multi-chip Symmetric Multiprocessing (SMP) computer system utilizes an SMP device interconnect (fabric) bus to transfer commands and data between each device within the system. Each device includes a set of fabric configuration registers, which defines the manner in which the system's devices are interconnected.

When simulating an SMP system, a simulation program must accurately program all fabric configuration registers and maintain a database of all connections between devices in order to perform proper end-to-end tests, which includes address and data path transmission delay settings between devices and nodes. Each time a system configuration changes or a developer adds a new configuration, the developer must update the simulation program with delay values that are specific to the new model configuration.

SUMMARY

A configuration manager identifies a first device and a second device within a simulated system. Each device within the simulated system includes an inbound port and an outbound port. Next, the configuration manager injects a simulation only packet, at an "outbound time," on the first device's outbound port and detects that the second device's inbound port receives the simulation only packet at an "inbound time." As such, the configuration manager identifies a direct connection between the first device and the second device and computes a latency time for the connection. In turn, the configuration manager configures one or more first device configuration registers and one or more second device configuration registers based upon the computed latency time.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 7A is an example of a simulation only packet that a configuration manager utilizes in order to identify direct connections and compute latency times between devices;

FIG. 7B is an example of a different simulation only packet that includes an outbound time field, which a configuration manager utilizes during a different embodiment of the invention described herein;

FIG. 7C is an example of a node/device pair table that a configuration manager populates during a direct connection discovery process;

FIG. 8A is an example of a connection table that a configuration manager populates during a direct connection discovery process;

FIG. 8B is an example of a connection table that includes latency times and indirect connection entries;

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
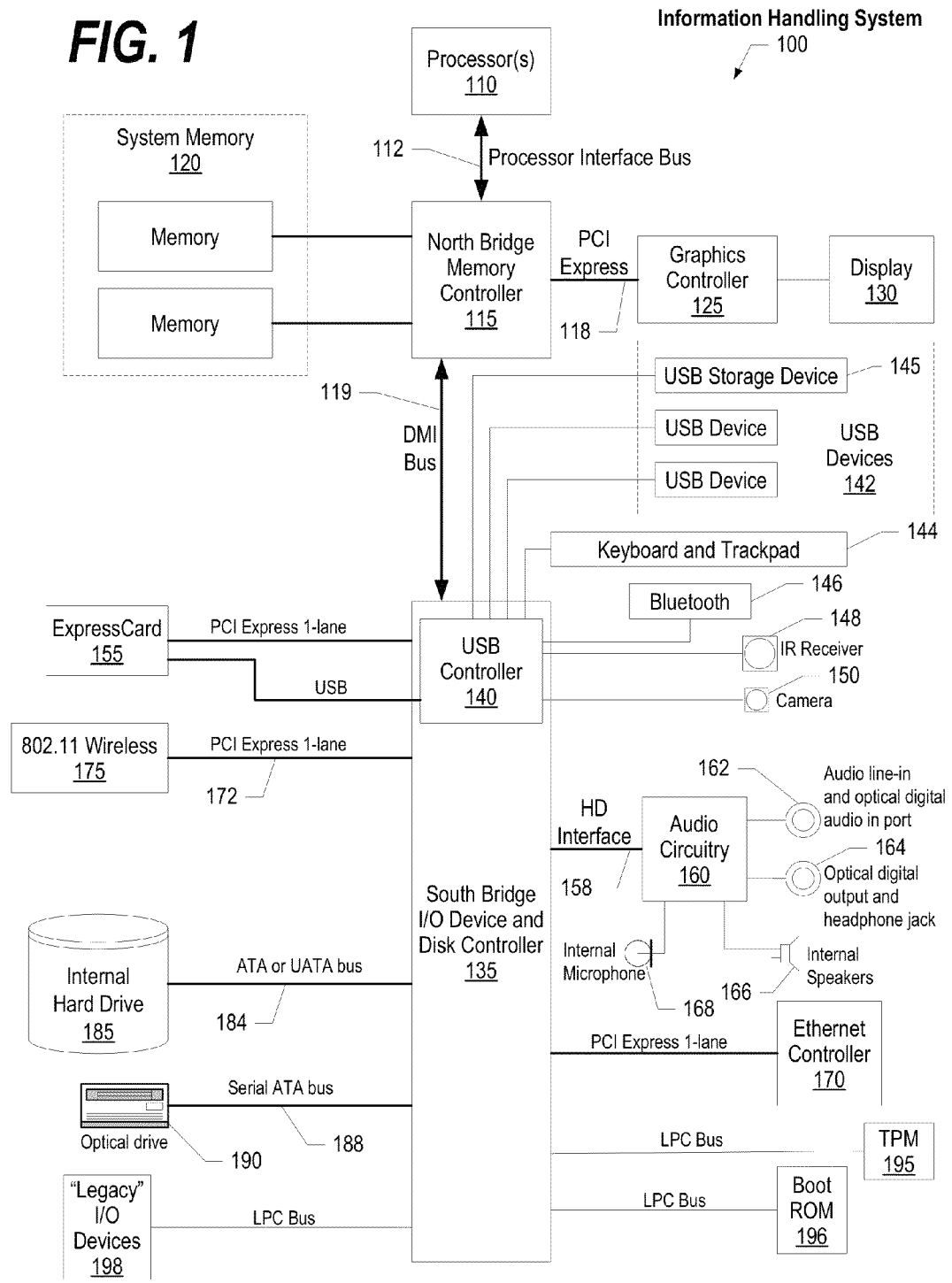
FIG. 1 is an exemplary block diagram of a data processing system in which the methods described herein can be implemented.
Figure 2:
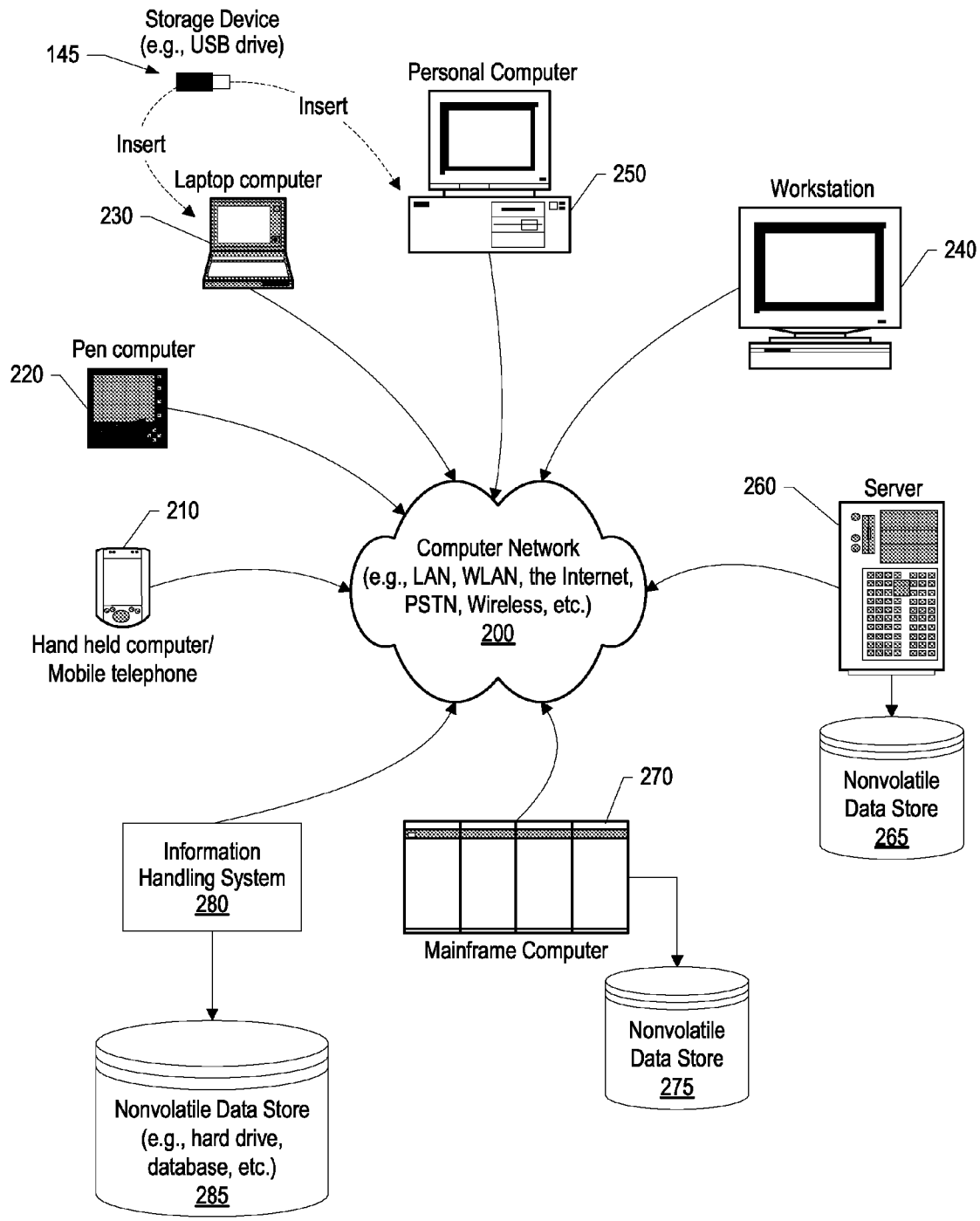
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
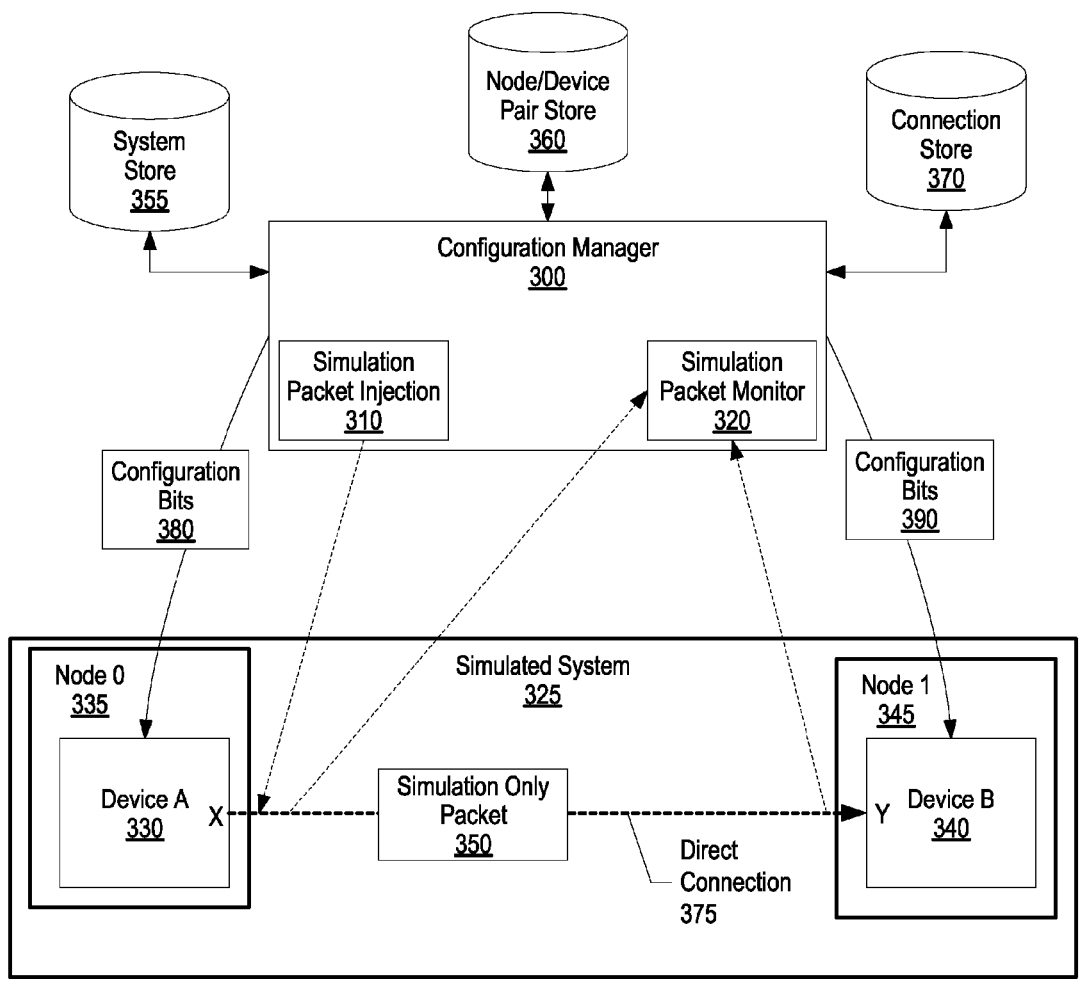
FIG. 3 is an exemplary diagram of a configuration manager injecting a simulation only packet onto a device's outbound port at an outbound time and detecting the simulation only packet at a device's inbound port at an inbound time in order to automatically compute connection latency times and program interconnect configuration registers within a simulation environment accordingly.

FIG. 3 is an exemplary diagram of a configuration manager injecting a simulation only packet onto a device's outbound port at an outbound time and detecting the simulation only packet at a device's inbound port at an inbound time in order to automatically compute connection latency times and program interconnect configuration registers within a simulation environment accordingly. Configuration manager 300 commences direct connection discovery by retrieving system information from system store 355. The system information includes information pertaining to simulated system 325, such as a port's node identifier/device identifier/port identifier and the number of devices included in simulated system 325. System store 355 may be stored on a nonvolatile storage area, such as a computer hard drive.

Next, configuration manager 300 identifies each of simulated system 325's device inbound ports and outbound ports utilizing the system information. The example shown in FIG. 3 shows that simulated system 325 includes two devices, which are device A 330 and device B 340. Device A 330 includes port X and device B 340 includes port Y. As one skilled in the art can appreciate, device ports are typically unidirectional. Meaning, device A 330's port X includes an outbound driver and also includes an inbound receiver. FIG. 3 shows configuration manager 300 injecting simulation only packet 350 onto device A 330 port X's outbound port. Simulation only packet 350 includes information that identifies the particular injected port. Using the example shown in FIG. 3, simulation only packet 350 includes information that identifies node 0 335, device A 330, port X (see FIG. 7A and corresponding text for further details). In one embodiment, simulation only packet 350 includes an outbound time, which is a time at which simulation packet injection 310 injects simulation only packet 350 onto device A 330 port X's outbound port (see FIG. 7B and corresponding text for further details).

Configuration manager 300 uses simulation packet monitor 320 to monitor simulated system 325's outbound ports and inbound ports. As such, simulation packet monitor 320 detects simulation only packet 350 on device A 330 port X's outbound port. In turn, configuration manager 300 creates an outbound connection entry in connection store 370 that identifies device A 330 port X's outbound port and also includes the outbound time at which simulation packet monitor 320 detected simulation only packet 350. Connection store 370 may be stored on a nonvolatile storage area, such as a computer hard drive.

In addition, configuration manager 300 monitors each of simulated system 325's device inbound ports in order to detect simulation only packet 350's destination. As can be seen, simulation only packet 350 travels to device B 340's port Y, which simulation only packet monitor 320 detects. Once detected, configuration manager 300 creates an inbound connection entry in connection store 370 that identifies device B 340 Y's inbound port and also includes an inbound time, which is the time at which simulation packet monitor 320 detects simulation only packet 350 (see FIGS. 8A, 8B, and corresponding text for further details).

Configuration manager 300 also extracts sending port information from simulation only packet 350 (node ID/device ID/port ID), and enters a node/device pair in node/device pair store 360, which is node 0 335/device A 330. Configuration manager 300 utilizes the node/device pair information after the direct connection discovery process in order to ensure that each device is connected (directly or indirectly) to other devices (see FIGS. 14, 15, and corresponding text for further details). Node/device pair store 360 may be stored on a nonvolatile storage area, such as a computer hard drive.

Once configuration manager 300 completes the direct connection discovery process, configuration manager 300 identifies direct connections between devices utilizing the connection entries stored in connection store 370 and computes latency times for the direct connections. As can be seen, configuration manager identifies direct connection 375 between device A 330 and device B 340 due to the fact that configuration manager 300 injected simulation only packet 350 on device A 330 port X and detected the packet on device B 340 port Y. Configuration manager 300 computes direct connection 375's latency time by subtracting the outbound time from the inbound time, and stores the latency time with the inbound connection entry in connection store 370.

In turn, configuration manager 300 configures device A 330's and device B 340's configuration registers via configuration bits 380 and 390, respectively. The configuration registers specify the connection between the two devices such that the devices understand a manner in which to send information to each other and latency times associated with sending the information. In addition to identifying direct connections between devices, configuration manager 300 identifies indirect connections, along with indirect latency times, between devices that are not directly connected. Indirect connections are connections that commence at a starting device and travel through one or more devices before terminating at a destination device (see FIGS. 5A-6B, 15, and corresponding text for further details).

In one embodiment, instead of monitoring device A 330's outbound ports, configuration manager 300 includes the outbound time in simulated only packet 350 (see FIG. 7B and corresponding text for further details). In this embodiment, when configuration manager 300 detects simulation only packet 350 on device B 340's inbound port Y, configuration manager 300 extracts the outbound time from simulation only packet 350 and stores the outbound time in the inbound connection entry. In turn, configuration manager 300 computes the latency time by subtracting the outbound time from the inbound time, both of which are stored in the inbound connection entry.

Figure 4:
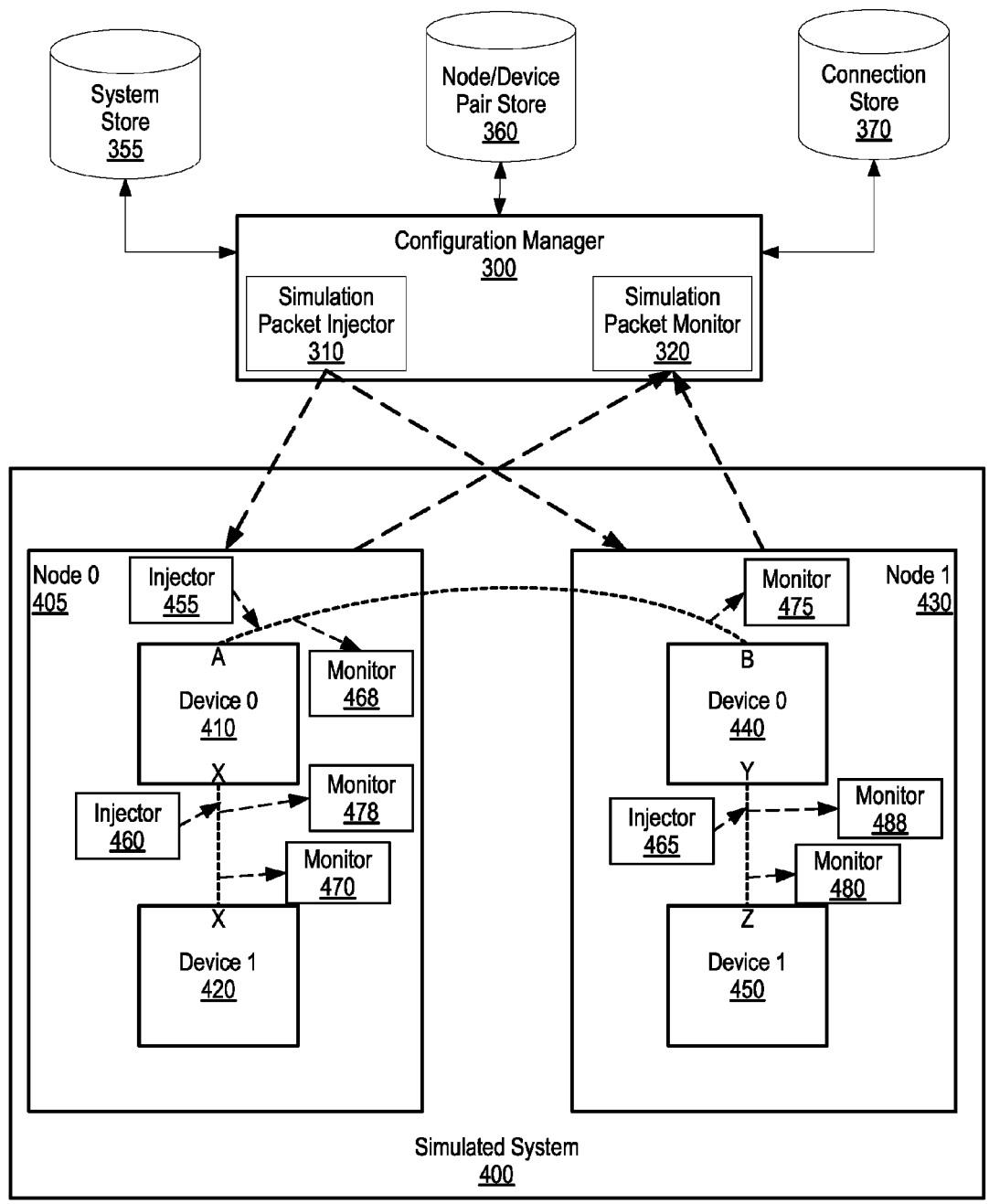
FIG. 4 is an exemplary diagram of a configuration manager performing a direct connection discovery process and latency time computations on a simulated system that includes multiple devices within multiple nodes.

FIG. 4 is an exemplary diagram of a configuration manager performing a direct connection discovery process and latency time computations on a simulated system that includes multiple devices within multiple nodes. FIG. 4 is similar to FIG. 3 with the exception that simulated system 400 includes two devices per each node. As can be seen, node 0 405 includes device 0 410 and device 1 420, and node 1 430 includes device 0 440 and device 1 450.

Configuration manager 300 retrieves system information from system store 355 and identifies simulated system 400's device inbound and outbound ports. In turn, simulation only packet injector 310 injects simulation only packets at injectors 455, 460, and 465. Simulation only packet monitor 320 monitors outbound ports at monitor 468, 478, and 488, and also monitors inbound ports at monitor 470, 475, and 480. As discussed above, each port includes an outbound driver and an inbound receiver and, therefore, during configuration manager 300's packet discovery process, the injectors/monitors shown in FIG. 4's example will switch. Meaning, the ports that are originally specified as an outbound port will then become specified as an inbound port.

As simulation only packet monitor 320 detects packets, configuration manager 300 extracts node/device pair information from the simulation only packets and stores the node/device pair information in node/device pair store 360. In addition, configuration manager 300 creates outbound connection entries and inbound connection entries in connection store 370 that identify direct connections between devices as well as their respective outbound times and inbound times. Once configuration manager 300 completes the direct connection discovery process, configuration manager 300 identifies indirect connections and their corresponding indirect latency times between devices (see FIGS. 5A-6B and corresponding text for further details).

Figure 5A:
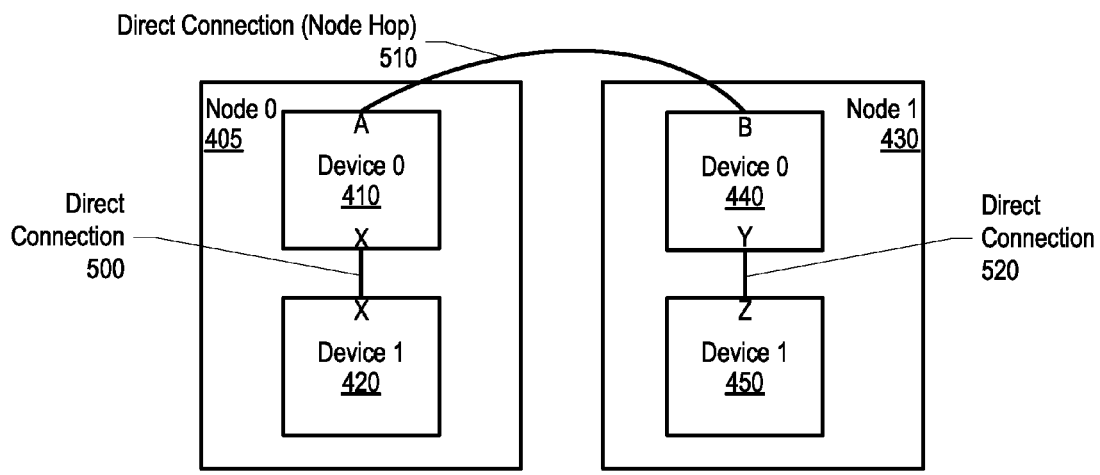
FIG. 5A is an exemplary diagram showing identified direct connections between devices through a direct connection discovery process.

FIG. 5A is an exemplary diagram showing identified direct connections between devices through a direct connection discovery process. After a configuration manager proceeds through the direct connection discovery process, the configuration manager identifies direct connections between devices and computes corresponding latency times. The direct connections may be internal to a particular node, or some direct connections may be between nodes (node hop connections).

FIG. 5A shows three direct connections, which are direct connections 500, 510, and 520. Direct connection 500 connects device 0 410 port x to device 1 420 port x. Direct connection 520 connects device 0 440 port Y to device 1 450 port Z. And, direct connection 510, which is a node hop connection, connects device 0 410 port A to device 0 440 port B. As discussed below, the configuration manager also creates indirect connections between devices by linking direct connections. In addition, as discussed below, the configuration manager adds direct connection latency times together in order to compute indirect latency times between devices.

Since each device within a node is directly connected by default, the indirect connections are connections between devices that reside in different nodes. As a part of the indirect connection identification process, the configuration manager identifies node hop connections in order to "hop" from the sending node to the destination node. The sending node includes the sending device and the destination node includes the destination device.

Although not shown, each direct connection has an opposite connection. Meaning, direct connection 500 may start at device 1 420 and end at device 0 410, but another direct connection exists that starts at device 0 410 and ends at device 1 420.

Figure 5B:
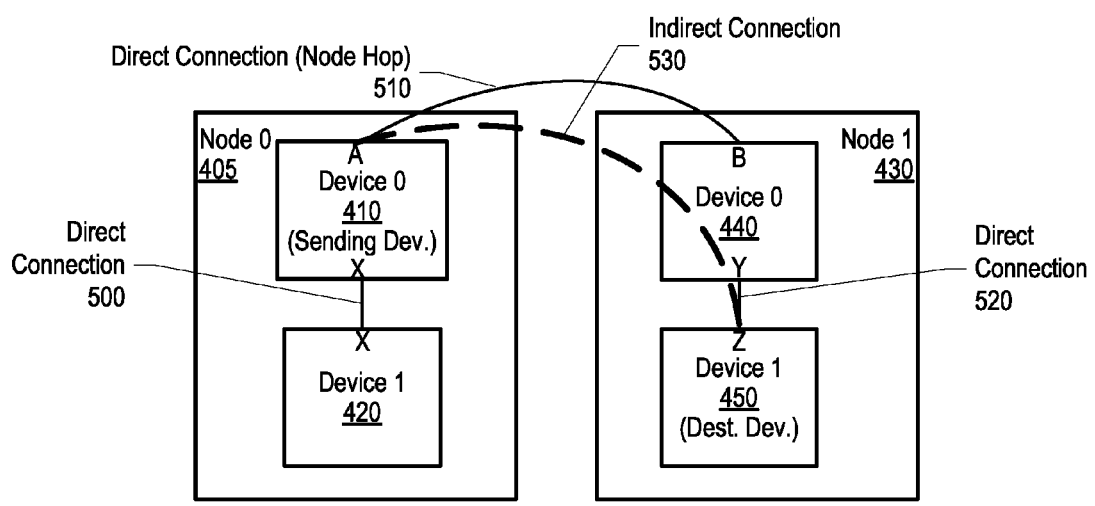
FIG. 5B is an exemplary diagram showing a configuration manager linking various direct connections in order to identify an indirect connection between two non-directly connected devices and compute a corresponding indirect latency time between the two devices.

FIG. 5B is an exemplary diagram showing a configuration manager linking various direct connections in order to identify an indirect connection between two non-directly connected devices and compute a corresponding indirect latency time between the two devices. The example shown in FIG. 5B shows the configuration manager identifying an indirect connection (indirect connection 530) between device 0 410 and device 1 450.

In order to identify the indirect connection, the configuration manager selects device 0 410 as a sending device and selects device 1 450 as a destination device. In turn, the configuration manager creates a connection entry in a connection table and enters the sending device information and the destination device information, which includes a node identifier, a device identifier, and a port identifier (see FIG. 8B, row 854, and corresponding text for further details).

Next, the configuration manager identifies a direct connection (node hop connection) that connects the sending node (node 0 405) to the destination node (node 1 430), which is direct connection 510. The node hop connection initiates from a "node hop initiating device" (device 0 410) and ends at a "node hop recipient device" (device 0 440). Since, in this example, the node hop initiating device is the same as the sending device, the configuration manager includes the node hop connection information into the connection entry as the first "hop" and also includes direct connection 510's latency time in the connection entry.

Next, the configuration manager identifies a direct connection between the node hop recipient device and the destination device, which is direct connection 520. Once identified, the configuration manager includes direct connection 520 information into the entry and adds direct connection 520's latency time to direct connection 510's latency time, resulting in an indirect latency time in the connection entry. The resulting connection entry includes all information required for device 0 410 to send information to device 1 450 through device 0 440.

Figure 6A:
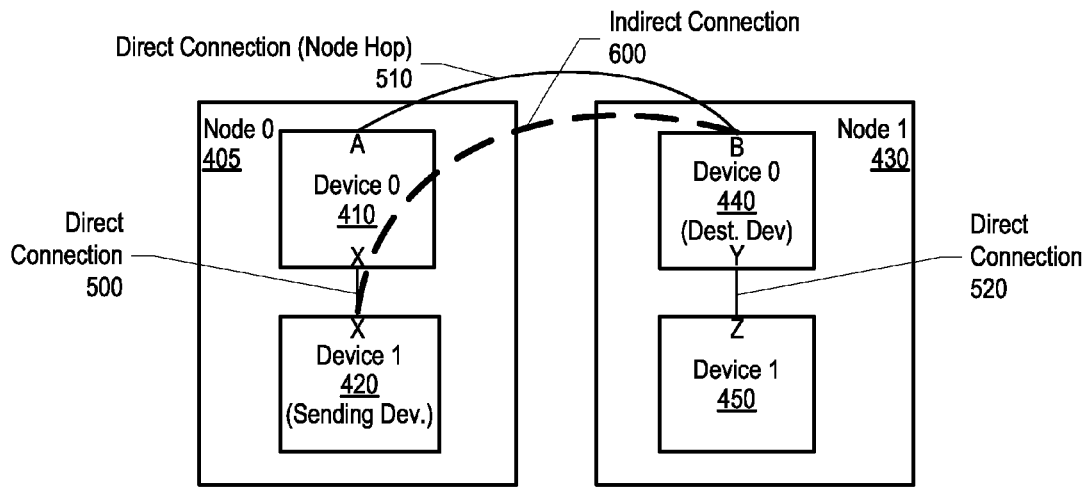
FIGS. 6A and 6B are exemplary diagrams showing a configuration manager linking various direct connections in order to identify indirect connections and compute indirect latency times between devices.

FIG. 6A is a diagram showing a configuration manager linking various direct connections in order to identify an indirect connection and compute an indirect latency time between device 1 420 and device 0 440. In order to identify the indirect connection, the configuration manager selects device 1 420 as a sending device and selects device 0 440 as a destination device. In turn, the configuration manager creates a connection entry in a connection table and enters the sending device information and the destination device information, which includes a node identifier, a device identifier, and a port identifier.

Next, the configuration manager identifies a direct connection that connects the sending node (node 0 405) to the destination node (node 1 430), which is direct connection 510. As discussed above in FIG. 5B, the node hop connection initiates from a "node hop initiating device" (device 0 410) and ends at a "node hop recipient device" (device 0 440). In the example shown in FIG. 6A, the node hop initiating device is not the same as the sending device. As such, the configuration manager identifies an "inter-sending node direct connection" between the sending device (device 1 420) and the node hop initiating device (device 0 410), which is direct connection 500. Direct connection 500 is the first connection towards establishing indirect connection 600. As such, the configuration manager enters direct connection 500 information, which includes direct connection 500's latency time, into the connection entry.

Next, the configuration manager enters the node hop connection information (direct connection 510) into the connection entry and adds direct connection 510's latency time to direct connection 500's latency time, resulting in an indirect latency time. Since, in this example, the node hop recipient device is the same as the destination device, the connection entry includes all information required for device 1 420 to send information to device 0 440 through device 0 410.

Figure 6B:
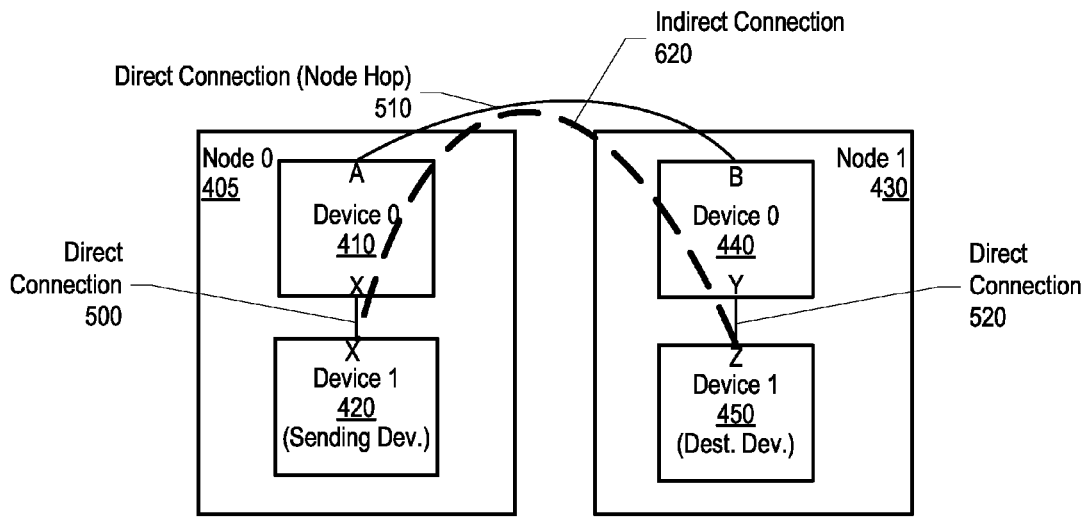

FIG. 6B is a diagram showing a configuration manager linking various direct connections in order to identify an indirect connection and compute an indirect latency time between device 1 420 and device 1 450. In order to create the indirect connection, the configuration manager selects device 1 420 as a sending device and selects device 1 450 as a destination device. In turn, the configuration manager creates a connection entry in a connection table and enters the sending device information and the destination device information, which includes a node identifier, a device identifier, and a port identifier (see FIG. 8B, row 656, and corresponding text for further details).

Next, the configuration manager identifies a direct connection that connects the sending node (node 0 405) to the destination node (node 1 430), which is direct connection 510. As discussed above in FIG. 5B, the node hop connection initiates from a "node hop initiating device" (device 0 410) and ends at a "node hop recipient device" (device 0 440). In the example shown in FIG. 6B, the node hop initiating device is not the same as the sending device. As such, the configuration manager identifies an "inter-sending node direct connection" between the sending device (device 1 420) and the node hop initiating device (device 0 410), which is direct connection 500. In turn, the configuration manager enters direct connection 500 information, which includes direct connection 500's latency time, into the connection entry.

Next, the configuration manager enters the node hop connection information (direct connection 510) into the entry and adds direct connection 510's latency time to direct connection 500's latency time. In this example, the node hop recipient device is not the same as the destination device. As such, the configuration manager identifies an "inter-destination node direct connection" between the node hop recipient device (device 0 440) and the destination device (device 1 450), which is direct connection 520. In turn, the configuration manager enters direct connection 520 information into the connection entry and adds direct connection 520's latency time to direct connection 500's latency time and direct connection 510's latency time, resulting in an indirect latency time. At this point, the connection entry includes all information required for device 1 420 to send information to device 1 450 through device 0 410 and device 0 440.

FIG. 7A is an example of a simulation only packet that a configuration manager utilizes in order to identify direct connections and compute latency times between devices. Simulation only packet 700 includes fields 710-740. Field 710 is a simulation only bit that is valid only for simulation only packets. As such, the configuration manager detects simulation only packets at inbound ports by checking the simulation only bit included in field 710 (see FIG. 11 and corresponding text for further details).

Fields 715-725 include information corresponding to the outbound port in which the configuration manager injects the simulation only packet. For example, if the configuration manager injects the simulation only packet at node 0's device 1's port X, field 715 includes "node 0," field 720 includes "device 1," and field 725 includes "port X." The configuration manager uses this information when it receives a simulation only packet on an inbound port in order to identify the simulation only packet's sending device.

Field 735 includes a traffic type field, which specifies whether the traffic sent from the outbound port will be data only, command only, or data and command. And, field 740 specifies the connection width of the traffic, such as 4-byte, 8-byte, and etcetera.

FIG. 7B is an example of a different simulation only packet that includes an outbound time field, which a configuration manager utilizes during a different embodiment of the invention described herein. In this embodiment, the configuration manager includes an outbound time in field 748, which is a time at which the configuration manager injects simulation only packet 742 onto a device's outbound port. In turn, in this embodiment, the configuration manager extracts the outbound time from simulation only packet 742 when the configuration manager detects simulation only packet 742 on a device's inbound port and logs the outbound time and inbound time accordingly in an inbound connection entry.

FIG. 7C is an example of a node/device pair table that a configuration manager populates during a direct connection discovery process. As the configuration manager detects simulation only packets on inbound ports included in simulated system 400 shown in FIG. 4, the configuration manager extracts node and device information from the simulation only packets and enters the information in table 750. As such, table 750 includes information for each device included in simulation system 400. As can be seen, row 760 identifies node 0 405/device 0 410. Row 770 identifies node 0 405/device 1 420. Row 780 identifies node 1 430/device 0 440. And, row 790 identifies node 1 430/device 1 450. The configuration manager uses this information during connection analysis in order to ensure that a connection (direct or indirect) exists between each device (see FIG. 14, 15, and corresponding text for further details).

FIG. 8A is an example of a connection table that a configuration manager populates during a direct connection discovery process. As the configuration manager detects simulation only packets on outbound ports and inbound ports, the configuration manager creates outbound connection entries (rows 802, 806, 810) and inbound connection entries (rows 804, 808, 812) in table 800.

Referring to FIG. 4, when configuration manager 300 detects simulation only packets on outbound ports using monitors 468, 478, and 488, configuration manager 300 creates outbound connection entries shown in table 800's rows 802, 806, and 810, respectively. As can be seen, rows 802, 806, and 810 include sending port information in column 814 and include outbound times in column 824. The outbound times shown in table 800 correspond to a simulation cycle time.

When configuration manager 300 detects simulation only packets on inbound ports using monitors 475, 470, and 480, configuration manager 300 creates inbound connection entries shown in table 800's rows 804, 808, and 812, respectively. As can be seen, rows 802, 806, and 810 include destination port information in column 816 and include inbound times in column 826. The inbound times shown in table 800 correspond to a simulation cycle time.

In addition, when configuration manager 300 detects a simulation only packet at an inbound port, configuration manager 300 extracts "sending device" information from the simulation only packet and enters the information in table 800's column 814. As can be seen, row 804 includes an entry for node 0, device 0, port A, which corresponds to FIG. 4's node 0 405, device 0 410, port A. The configuration manager also extracts traffic type information and connection width information from the simulation only packet, and enters the information in columns 818 and 820, respectively (see FIG. 7A and corresponding text for further details).

Once the configuration manager completes the direct connection discovery process, the configuration manager evaluates table 800's connection entries and sets aggregate bit values in column 822 for those entries that correspond to matching node/device pairs. For example, if two direct connections exist between node 0/device 0 and node 1/device 1 utilizing different ports on the devices, the configuration manager sets the aggregate bit for each connection entry (see FIG. 14 and corresponding text for further details).

FIG. 8B is an example of a connection table that includes latency times and indirect connection entries. Table 840 is an expansion of table 800 shown FIG. 8A. Row 842 includes a latency time for a direct connection between node 0/device 0/port A and node 1/device 0/port B. The configuration manager computes this latency time by subtracting row 802's outbound time (FIG. 8A) from row 804's inbound time (FIG. 8A), which results in a value of 5 (1250−1245=5). Row 844 includes a latency time in the reverse direction, which the configuration manager computes from connection entries not shown in FIG. 8A.

Likewise, row 846 includes a latency time for a direct connection between node 0/device 0/port X and node 0/device 1/port X, which is the difference between row 806's outbound time and row 808's inbound time (FIG. 8A). Row 848 includes a latency time in the reverse direction, which the configuration manager computes from connection entries not shown in FIG. 8A. And, row 850 includes a latency time for a direct connection between node 1/device 0/port Y and node 1/device 1/port Z, which is the difference between row 810's outbound time and row 812's inbound time (FIG. 8A). Row 852 includes a latency time in the reverse direction, which the configuration manager computes from connection entries not shown in FIG. 8A.

In addition, the configuration manager analyzes a node/device pair table, such as table 750 shown in FIG. 7B, in order to determine device pairs that do not have a direct connection. Row 854 includes connection information corresponding to FIG. 5B's indirect connection 530 that indirectly connects device 0 410 to device 1 450. Row 854 includes node 0 405/device 0 410/port A information in sending port column 858 and includes node 1 430/device 1 450/port Z information in destination column 860. Since indirect connection 530 travels through node 1 430/device 0 440, column 862 includes node 1 430/device 0 440/port B information as "Hop 1 In" and column 864 includes node 1 430/device 0 440/port Y information as "Hop 1 Out." The configuration manager also sets a "Hop Valid" bit in column 868 to indicate that the indirect connection includes a hop. The configuration manager adds together direct connection latency times for direct connections 510 and 520 (shown in FIG. 5B), and stores an indirect latency time in column 861. As can be seen, row 854 includes an indirect latency time of "49," which is the sum of direction connection 510's latency time of "5" (row 842) and direction connection 520's latency time of "44" (row 850).

Row 856 includes connection information corresponding to FIG. 6B's indirect connection 620 that indirectly connects device 1 420 to device 1 450. Row 856 includes node 0 405/device 1 420/port X information in column 858, and includes node 1 430/device 1 450/port Z information in column 860. Since indirect connection 620 travels through device 0 410, column 862 includes node 0 405/device 0 410/port X information as "Hop 1 In" and column 864 includes node 0 405/device 0 410/port A information as "Hop 1 Out." In addition, indirect connection 620 travels through device 0 440. As such, column 870 includes node 1 430/device 0 440/port B information as "Hop 2 In," and column 872 includes node 1 430/device 0 440/port Y information as "Hop 2 Out." The configuration manager also sets "Hop Valid" bits in columns 868 and 874 to indicate that the indirect connection includes hops. The configuration manager adds together direct connection latency times for direct connections 500, 510, and 520 (shown in FIG. 5B), and stores an indirect latency time in column 861. As can be seen, row 856 includes an indirect latency time of "82," which is the sum of direction connection 500's latency time of "33" (row 848), direction connection 510's latency time of "5" (row 842), and direction connection 520's latency time of "44" (row 850).

Figure 9:
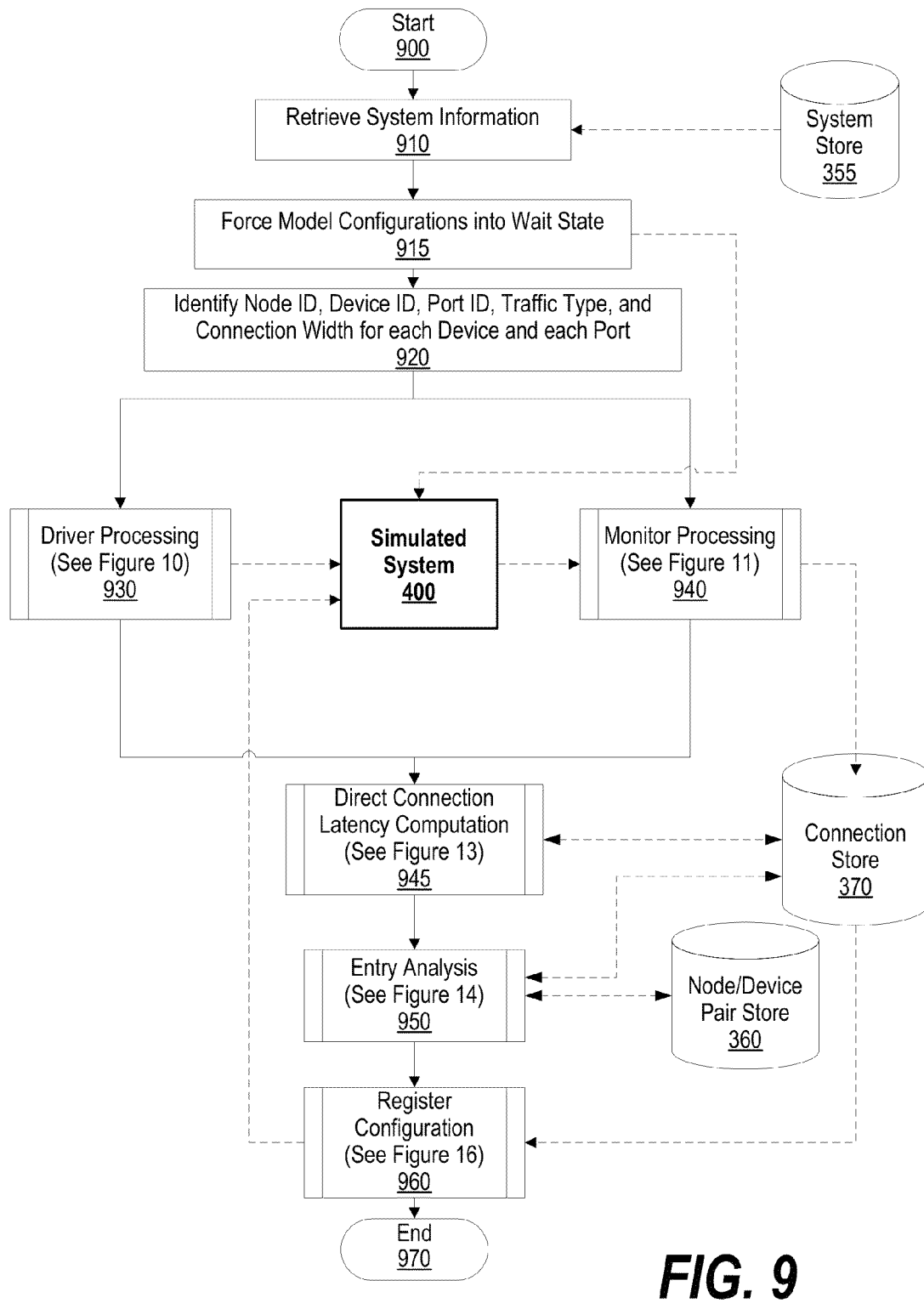
FIG. 9 is a high-level flowchart showing steps taken a configuration manager computing latency times during a connection discovery process and configuring device registers accordingly.

FIG. 9 is a high-level flowchart showing steps taken a configuration manager computing latency times during a connection discovery process and configuring device registers accordingly. Configuration management processing commences at 900, whereupon a configuration manager retrieves system information from system store 355 (step 910). The system information includes node identifier/device identifier/port identifier information and the number of devices included in a system.

At step 915, the configuration manager forces the model configurations included in simulated system 400 into a wait state. The configuration manager utilizes the system information to identify node identifiers, device identifiers, port identifiers, traffic types and connection widths for each of simulated system 400's devices.

Figure 10:
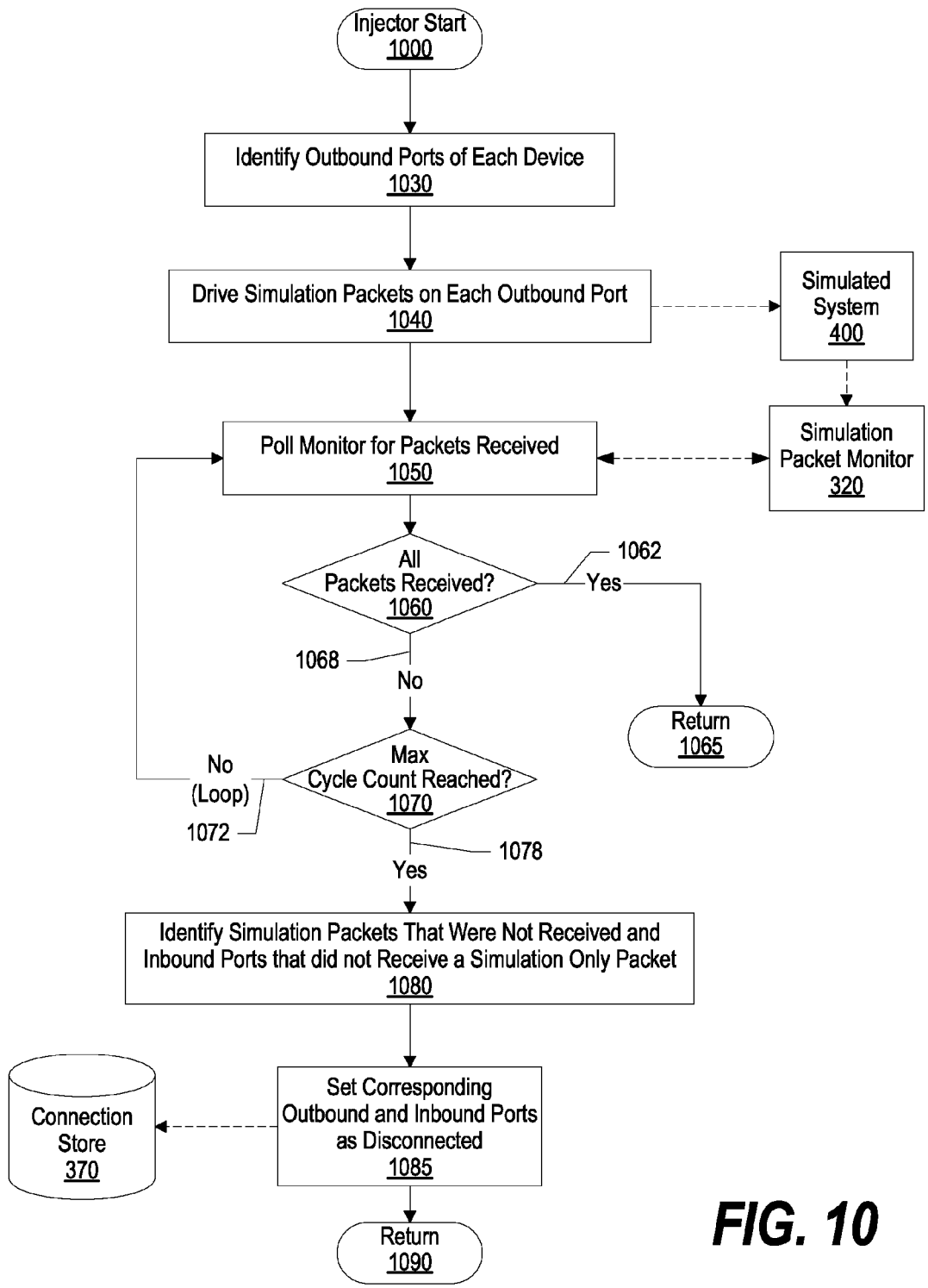
FIG. 10 is a flowchart showing steps taken in a configuration manager injecting simulation only packets onto a simulated system's device outbound ports.
Figure 11:
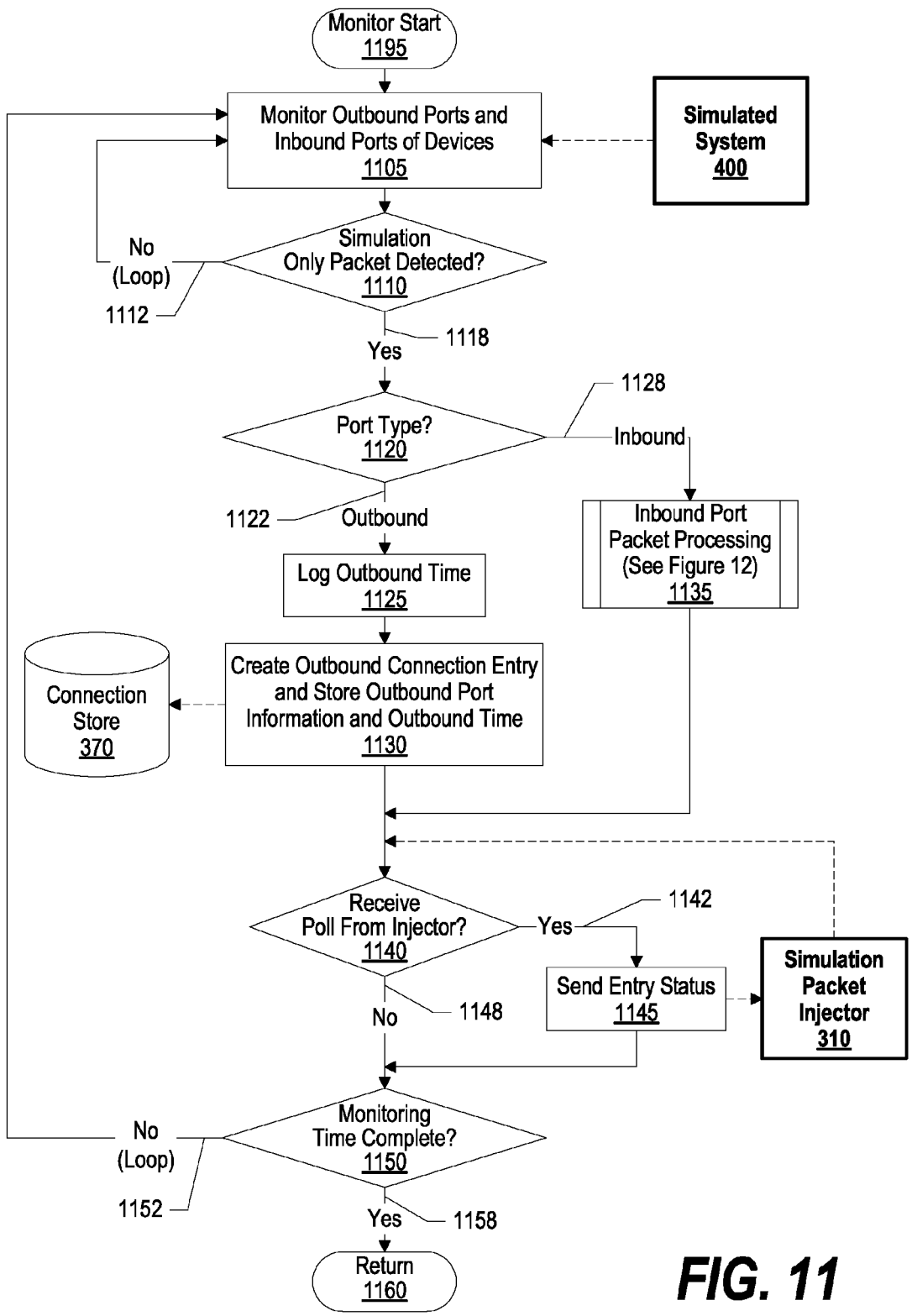
FIG. 11 is a flowchart showing steps taken in a configuration manager detecting simulation only packets on device outbound/inbound ports.

The configuration manager then invokes a direct connection discovery process by injecting simulation only packets onto each device's outbound ports included in system 400 and monitoring each device's inbound ports for the simulation only packets (pre-defined process blocks 930 and 940, see FIGS. 10 and 11, respectively, and corresponding text for further details). During the configuration manager's monitoring process, the configuration manager creates direct connection entries in connection store 370. The configuration manager creates a direct connection entry when the configuration manager receives a simulation only packet and identifies the sending location (node/device/port) and the destination location (node/device/port).

Figure 13:
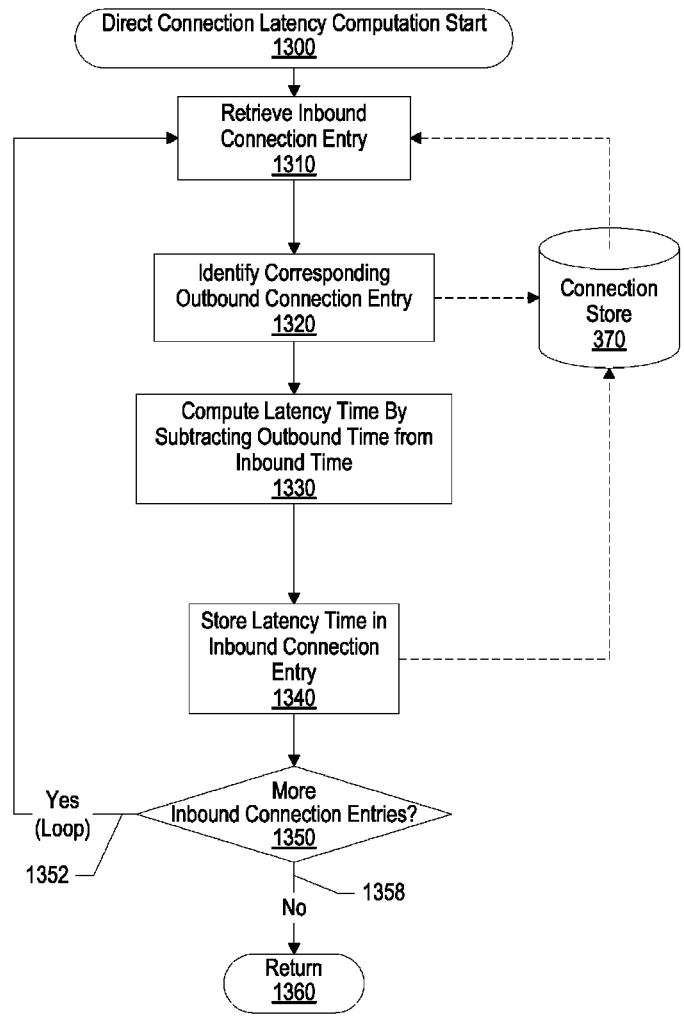
FIG. 13 is a flowchart showing steps taken in a configuration manager computing direct connection latency times between devices.

Once the configuration manager completes the direct connection discovery process, the configuration manager computes latency times for direct connections between devices by subtracting outbound times from corresponding inbound times (pre-defined process block 945, see FIG. 13 and corresponding text for further details). Next, the configuration manager identifies direct connections between devices, indirect connections between devices and computes indirect latency times between devices (pre-defined process block 950, see FIG. 14 and corresponding text for further details). For example, a direct connection may exist between a first device and a second device, and an indirect connection may exist between the first device and a third device, which passes through the second device. In this example, the configuration manager computes an indirect latency time between the first device and the third device.

In one embodiment, a user may pre-define a list of rules and, if any of the rules are broken during the process of identifying direct connections and indirect connections, the configuration manager flags the broken rules and stops the procedure. For example, a user may define rules such as 1) every device must have a path to another device, 2) links are connected in pairs, such that driver/receiver of each port are both connected to the driver/receiver of the other port, and 3) only one command port is active between devices.

Figure 16:
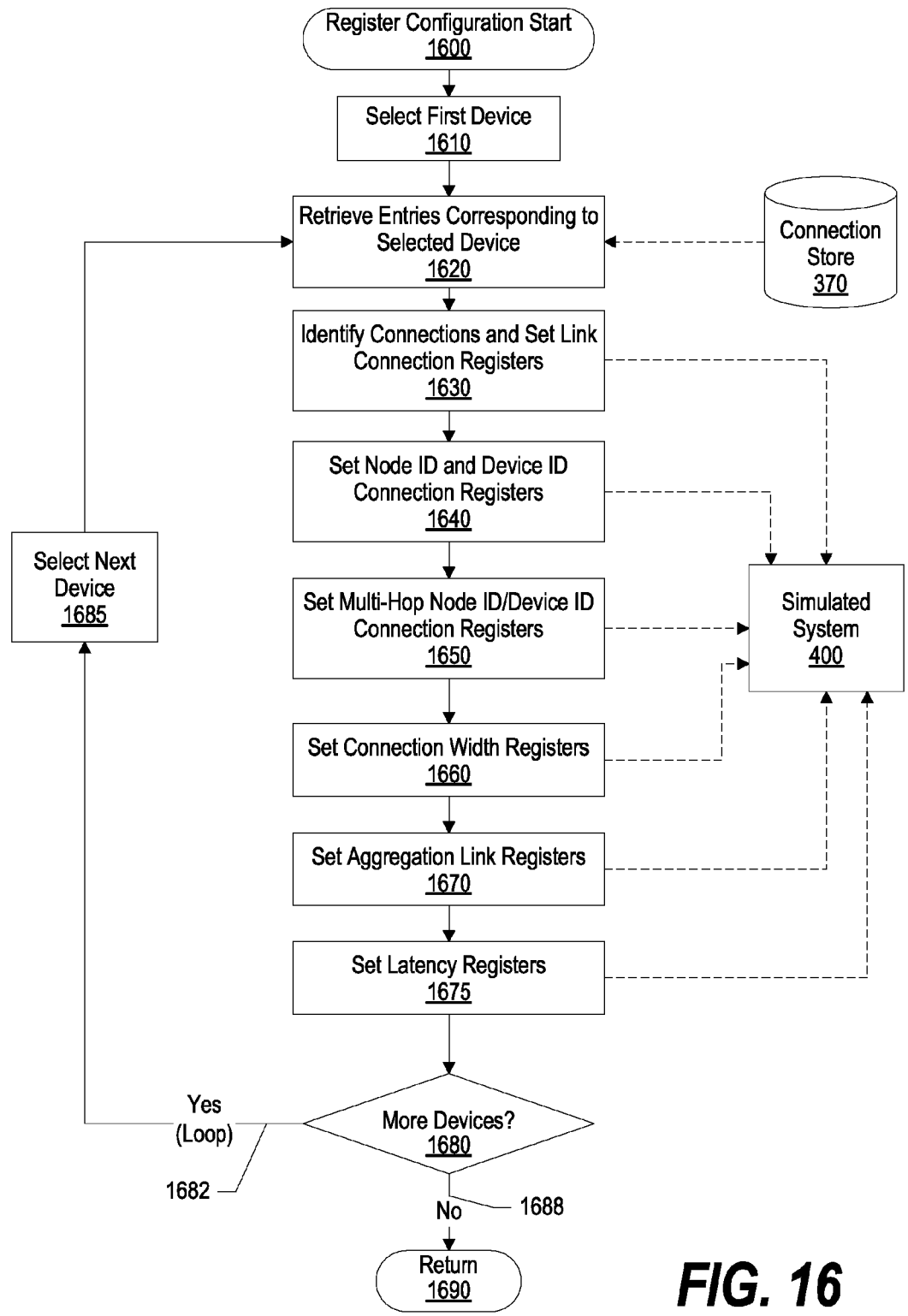
FIG. 16 is a flowchart showing steps taken in a configuration manager configuring registers after identifying device connections and latency times based upon a direct connection discovery process.

Once the configuration identifies the direct and indirect connections between the devices, the configuration manager sets configuration registers that correspond to the different devices accordingly (pre-defined process block 960, see FIG. 16 and corresponding text for further details). Processing ends at 970.

In one embodiment, a simulation reference model uses the identified connection information to predict expected simulation results. For example, once the configuration manager configures the registers and a real simulation commences, the simulation monitor program uses the collected information to predict a manner in which data should transfer from one device to the next. If the simulation monitor program detects data being routed along a path that does not correspond to the expected routing path, the simulation monitor program flags an error and fails the simulation.

FIG. 10 is a flowchart showing steps taken in a configuration manager injecting simulation only packets onto a simulated system's device outbound ports. Configuration manager injector processing commences at 1000, whereupon the configuration manager utilizes retrieved system information to identify device outbound ports (step 1030) and begins injecting simulation only packets onto each of simulated system 400's outbound ports (step 1040). The simulation only packets have a set simulation only bit, which identifies the packets as a simulation only packet (see FIG. 7A and corresponding text for further details).

At step 1050, the configuration manager polls simulation only packet monitor 320 to check which simulation only packets have been detected on inbound ports. Simulation only packet monitor 320 monitors each device's inbound ports for the simulation only packets while they are injected onto each device's outbound ports. The configuration manager determines whether simulation only packet monitor 320 received each of the simulation only packets (decision 1060). If simulation only packet monitor 320 received all of the simulation only packets, the configuration manager branches to "Yes" branch 1062 whereupon processing returns at 1065. On the other hand, if simulation only packet monitor 320 has not received all of the simulation only packets, the configuration manager branches to "No" branch 1068, whereupon the configuration manager determines whether a cycle counter has reached a maximum cycle count (e.g., whether monitoring time has expired) (decision 1070).

If time has not expired, the configuration manager branches to "No" branch 1072, which loops back to continue to poll simulation only packet monitor 320. This looping continues until the maximum cycle count is reached, at which point the configuration manager branches to "Yes" branch 1078.

At step 1080, the configuration manager identifies simulation only packets that were not received by any inbound port, and also identifies inbound ports that did not receive a simulation only packet. At step 1085, the configuration manager sets the corresponding inbound ports and outbound ports as disconnected in connection store 370. For example, the configuration manager may inject a simulation only packet onto device A's outbound port 2 and, in this example, simulation only packet monitor does not detect the particular simulation only packet on any inbound port. In this example, the configuration manager determines that device A's outbound port 2 is not connected to another device included in the system. Processing returns at 1090.

FIG. 11 is a flowchart showing steps taken in a configuration manager detecting simulation only packets on device outbound ports and inbound ports. Processing commences at 1100, whereupon the configuration manager monitors simulated system 400's device outbound ports and inbound ports (step 1105). When the configuration manager detects a packet, the configuration manager determines whether the packet is a simulation only packet by checking a bit included in the packet that specifically identifies simulation only packets (decision 1110). If the received packet is not a simulation only packet, the configuration manager branches to "No" branch 1112, which loops back to continue to monitor device ports. This looping continues until the configuration manager detects a simulation only packet, at which point the configuration manager branches to "Yes" branch 1118.

The configuration manager determines upon which port type the simulation only packet was detected (decision 1120). If the configuration manager detected the simulation only packet on an outbound port, the configuration manager branches to "Outbound" branch 1122, whereupon the configuration manager logs an outbound time at step 1125, such as a simulation clock cycle time. Next, at step 1130, the configuration manager creates an outbound connection entry in connection store 370 and stores outbound port information and the logged outbound time (see FIG. 8A and corresponding text for further details). The outbound port information, also referred to as the sending port information, is information that includes the outbound port's corresponding node ID, device ID, and port ID.

Figure 12:
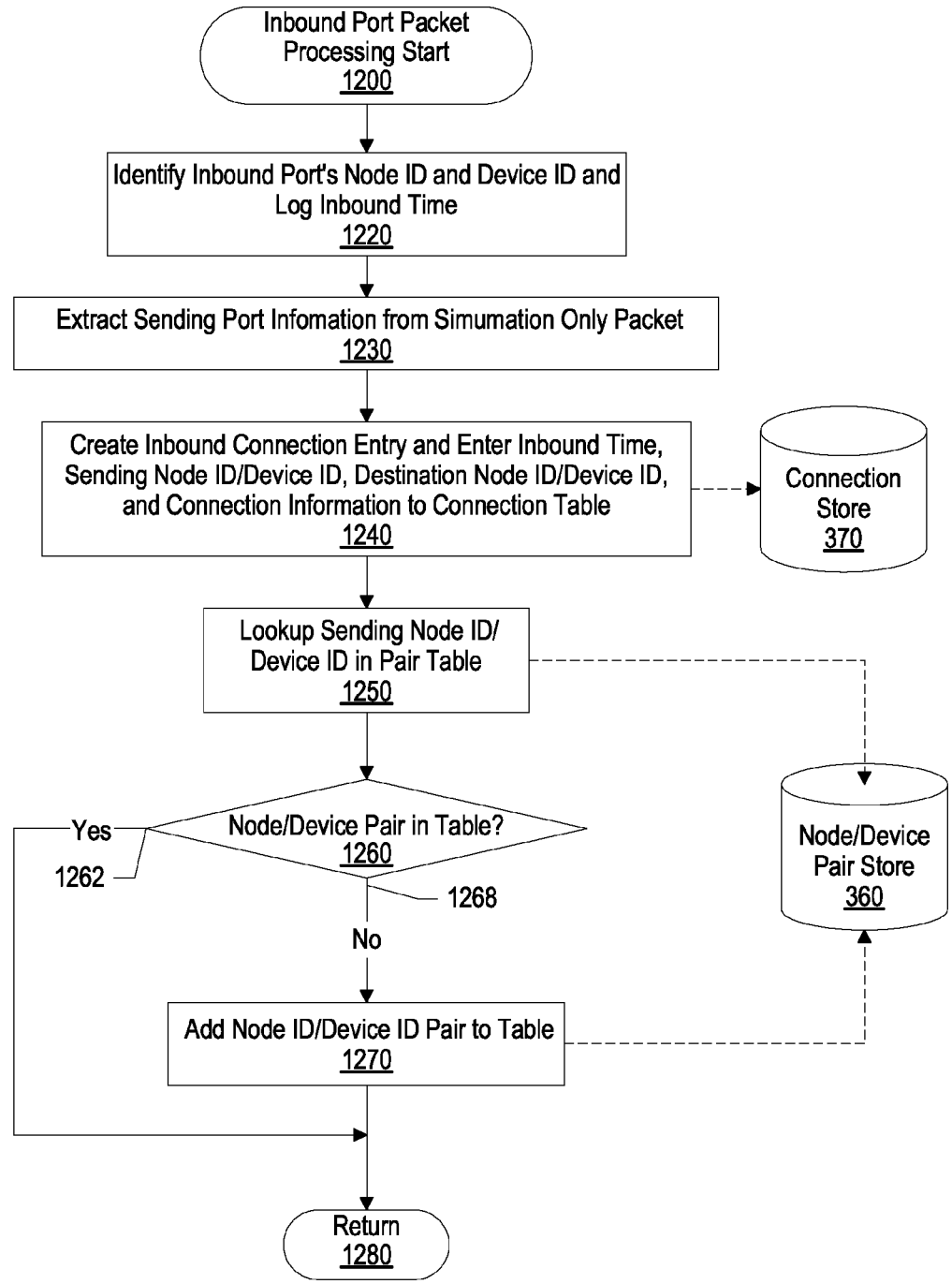
FIG. 12 is a flowchart showing steps taken in a configuration manager processing simulation only packets that the configuration manager detects on inbound ports.

On the other hand, if the configuration manager detected the simulation only packet on an inbound port, the configuration manager branches to "Inbound" branch 1128, whereupon the configuration manager creates an inbound connection entry for the detected simulation only packet (pre-defined process block 1135, see FIG. 12 and corresponding text for further details).

The configuration manager determines whether simulation only packet injector 310 requests status information from the simulation only packet monitor (decision 1140). Simulation only packet injector 310 periodically sends polling requests in order to determine whether a simulation only packet monitor has detected each simulation only packet. If simulation only packet injector 310 sent a polling request, the configuration manager branches to "Yes" branch 1142, whereupon the configuration manager sends status information to simulation only packet injector 310 that identifies simulation only packets that the simulation only packet monitor received (step 1145). On the other hand, if simulation packet injector 310 did not send a polling request, the configuration manager branches to "No" branch 1148, bypassing step 1145.

The configuration manager determines whether monitoring time has expired (decision 1150). If the monitoring time has not expired, the configuration manager branches to "No" branch 1152, which loops back and continues to monitor outbound/inbound ports for simulation only packets. This looping continues until the monitoring time has expired, at which point the configuration manager branches to "Yes" branch 1158, whereupon processing returns at 1160.

FIG. 12 is a flowchart showing steps taken in a configuration manager processing simulation only packets that the configuration manager detects on inbound ports. Inbound port processing commences at 1200, whereupon the configuration manager identifies an inbound port's information (node ID/device ID/port ID), and logs an inbound time (step 1220).

The configuration manager then extracts sending port information from the simulation only packet at step 1230, such as a sending node ID/device ID/port ID. In one embodiment, the simulation only packet includes an outbound time that identifies a time at which the configuration manager injected the simulation only packet onto the sending port. The configuration manager, at step 1240, creates an inbound connection entry in a connection table included in connection store 370 that includes the logged inbound time, the sending port information, and the inbound (destination) port information.

In order to track the node/device pairs that reside within simulated system 400, the configuration manager looks-up the sending node identifier/device identifier pair in node/device pair store 360 at step 1250. The configuration manager determines whether the pair is currently logged in the pair table (decision 1260). If the pair is not currently logged, the configuration manager branches to "No" branch 1268, whereupon the configuration manager adds the node/device pair in node/device pair store 360 at step 1270. On the other hand, if the pair already exists within the table, the configuration manager branches to "Yes" branch 1262, bypassing step 1270. Processing returns at 1280.

FIG. 13 is a flowchart showing steps taken in a configuration manager computing direct connection latency times between devices. Processing commences at 1300, whereupon the configuration manager retrieves an inbound connection entry from connection store 370 at step 1310. Inbound connection entries include an inbound time and destination port information, whereas outbound connection entries include an outbound time and sending port information (see FIG. 8A and corresponding text for further details).

Next, at step 1320, the configuration manager identifies an outbound connection entry that corresponds to the retrieved inbound connection entry. For example, the inbound connection entry may include sending port information for node 0/device A/port X and, in this example, the configuration manager identifies node 0/device A/port X's outbound connection entry. This outbound connection entry includes an outbound time, which is a time at which the configuration manager detects the simulation only packet on the outbound port.

The configuration manager, at step 1330, computes a latency time for the connection by subtracting the outbound time (included in the outbound connection entry) from the inbound time (included in the inbound connection entry). Next, at step 1340, the configuration manager stores the computed latency time in a latency time field included in the inbound connection entry in connection store 370 (see FIG. 8B and corresponding text for further details).

The configuration manager determines whether there are more inbound connection entries in which to process in connection store 370 (decision 1350). If there are more inbound connection entries in which to process, the configuration manager branches to "Yes" branch 1352, which loops back to process another inbound connection entry. This looping continues until there are no more inbound connection entries in which to process, at which point the configuration manager branches to "No" branch 1358, whereupon processing returns at 1360.

Figure 14:
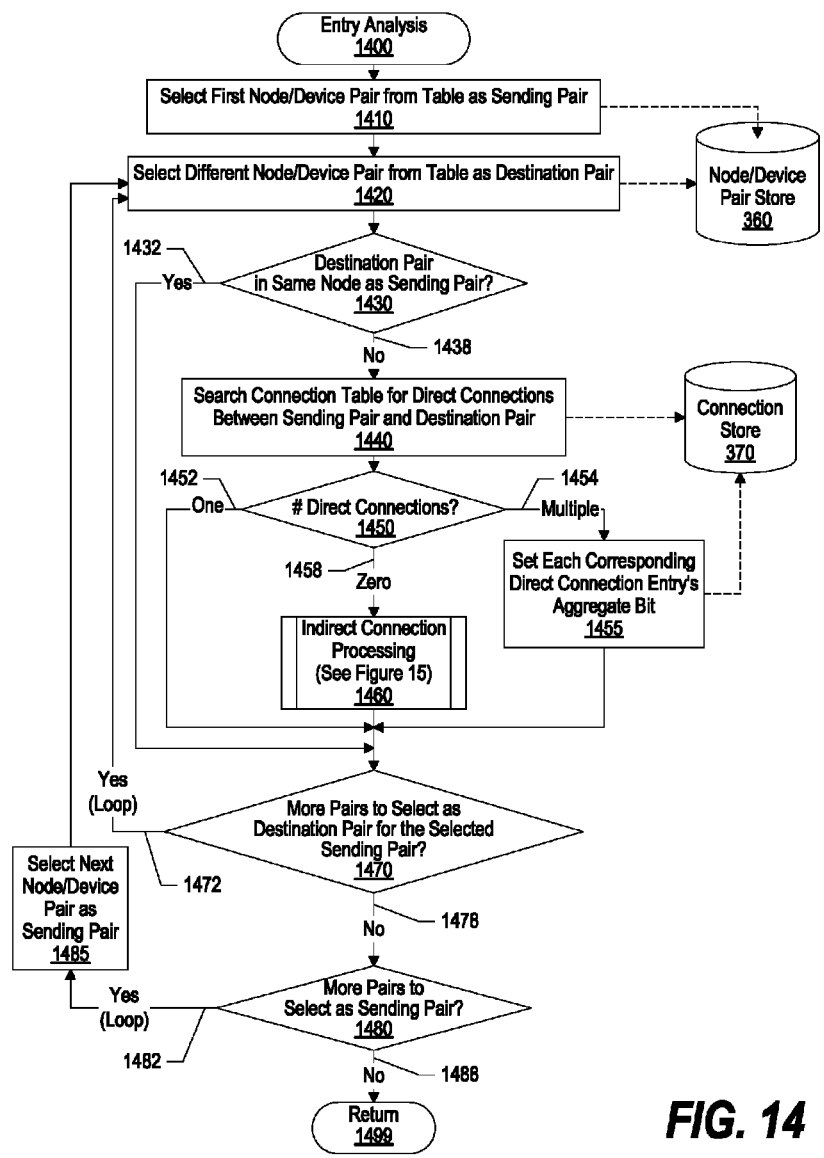
FIG. 14 is a flowchart showing steps taken a configuration manager identifying indirect connections and computing indirect latency times based upon information the configuration manager gathered during a direct connection discovery process.

FIG. 14 is a flowchart showing steps taken a configuration manager identifying indirect connections and computing indirect latency times based upon information the configuration manager gathered during a direct connection discovery process. Configuration management processing commences at 1400, whereupon the configuration manager selects a first node/device pair from a node/device table as a "sending pair" at step 1410. At step 1420, the configuration manager selects a different node/device pair from the node/device table as a "destination pair." The node/device table is stored in node/device pair store 360 and includes node/device pair combinations that the configuration manager identified during the direct connection discovery process (see FIG. 7B and corresponding text for further details).

The configuration manager determines whether the destination pair is within the same node as the sending pair (decision 1430). Devices within the same node are directly connected with each other and, therefore, the configuration manager already entered a direct connection entry and computed a latency time in a connection table stored in connection store 370 (see FIG. 8A, 8B and corresponding text for further details). For example, a node 0/device 1 sending pair resides in the same node as a node 0/device 2 destination pair. If the destination pair is within the same node as the sending pair, the configuration manager branches to "Yes" branch 1432, bypassing connection determination steps.

On the other hand, if the destination pair is not within the same node as the sending pair, the configuration manager branches to "No" branch 1438. At step 1440, the configuration manager searches the connection table included in connection store 370 for direct connections between the sending pair and the destination pair. For example, although in different nodes, node 0/device 1 may be directly connected to node 1/device 0.

The configuration manager determines the number of identified direct connections (decision 1450). If there are multiple direct connections, the configuration manager branches to "Multiple" branch 1454 whereupon the configuration manager sets an aggregate bit for each identified direct connection entry. For example, if node 0/device 1 connects to node 1/device 0 through three different ports, the configuration manager sets the aggregate bit for each of the three different entries. The configuration manager uses the aggregate bit to program any associated registers in the hardware that are related to aggregate links and a simulation reference model program uses the aggregate bit to build expected results (which data path will be used) for data transfers. On the other hand, if the configuration manager identifies one direct connection, the configuration manager branches to "One" branch 1452, bypassing steps 1455 or 1460.

Figure 15:
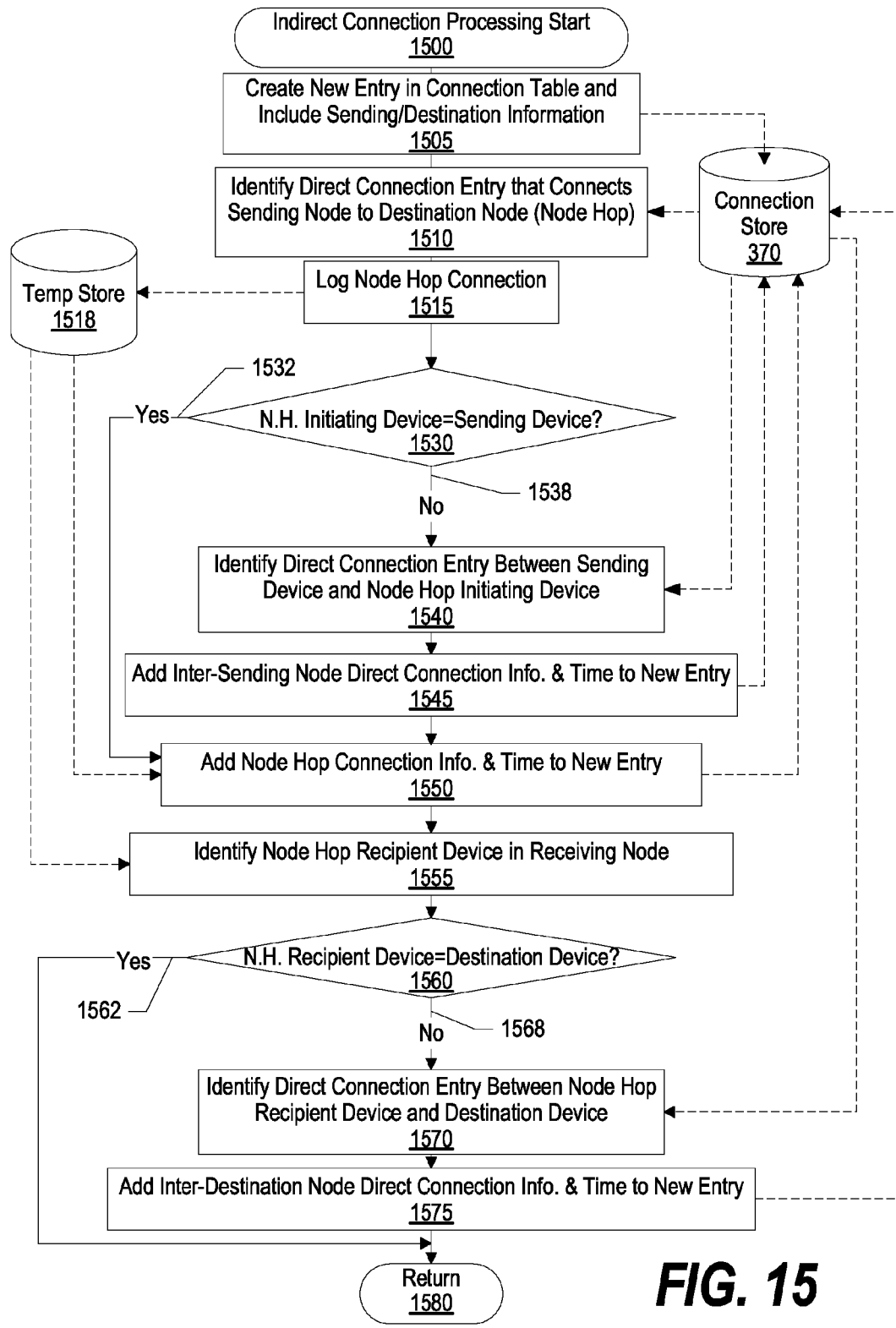
FIG. 15 is a flowchart showing steps taken a configuration manager identifying indirect connections between devices and computing indirect latency times.

Yet on the other hand, if the configuration manager does not identify any direct connections between the sending pair and the destination pair, the configuration manager branches to "Zero" branch 1458, whereupon the configuration manager proceeds through a series of steps to identify an indirect connection between the sending pair and the destination pair and compute an indirect latency time for the indirect connection (pre-defined process block 1460, see FIG. 15 and corresponding text for further details).

The configuration manager determines whether there are more node/device pairs in which to select as a destination pair for the selected sending pair (decision 1470). If there are more pairs to select as a destination pair, the configuration manager branches to "Yes" branch 1472, which loops back to select a different pair and identify direct/indirect connections between the sending pair and the newly selected destination pair. This looping continues until the configuration manager associates the selected sending pair to each of the other node/ device pairs, at which point the configuration manager branches to "No" branch 1478.

The configuration manager determines whether there are more pairs in which to select as a sending pair (e.g., the second entry in the pair table). If there are more pairs in which to select as a sending pair, the configuration manager branches to "Yes" branch 1482, which loops back to select (step 1485) and process the next pair as a sending pair. This looping continues until each pair is selected as a sending pair, at which point the configuration manager branches to "No" branch 1488, whereupon processing returns at 1499.

FIG. 15 is a flowchart showing steps taken a configuration manager identifying indirect connections between devices and computing indirect latency times. Indirect connections are connections between devices that pass through other devices. For example, if device 1 is directly connected to device 2, which is directly connected to device 3, device 1 is indirectly connected to device 3 through device 2.

Processing commences at 1500, whereupon the configuration manager creates a new entry in a connection table (located in connection store 370), and includes sending node/ device/port information and destination node/device/port information (step 1505). Referring to FIG. 8B, the configuration manager creates a new entry (row 854) and includes sending information (column 858) and destination information (column 860) in the new entry.

Next, the configuration manager identifies a direct connection that connects the sending node to the destination node (step 1510). For example, the sending device may be included in node 0 and the destination device may be included in node 1. In this example, the configuration manager identifies a direct connection between a device included in node 0 (node hop initiating device) and another device included in node 1 (node hop recipient device). The configuration manager logs the node hop connection in temporary store 1518 at step 1515 for later retrieval (see below).

The configuration manager determines whether the node hop initiating device is the same as the sending device (decision 1530). In other words, the configuration manager determines whether the sending device has a direct connection to a device that is located in the destination node.

If the sending device has a direct connection to a device in the destination node, the configuration manager branches to "Yes" branch 1532 bypassing steps 1540-1545 and adds the node hop connection information, which includes the node hop latency time, in the new entry (step 1550). On the other hand, if the node hop initiating device is not the same as the sending device, the configuration manager branches to "No" branch 1538, whereupon the configuration manager identifies a direct connection between the sending device and the node hop initiating device (step 1540). Referring to FIG. 6B, the configuration manager identifies device 0 410 as the node hop initiating device, and identifies direct connection 500 as the direct connection between the sending device (device 1 420) and device 0 410.

The configuration manager then adds "inter-sending node direct connection" information, including the direct connection's latency time, to the new entry at step 1545, which corresponds to the direct connection between the sending device and the node hop initiating device. Referring to FIG. 8B, row 856, the configuration manager populates column 862 with port information that connects the sending device to the node hop initiating device and adds the latency time in column 861.

Next, the configuration manager adds node hop connection information to the entry at step 1550, which includes adding the node hop's latency time to any latency time already stored in the connection entry, such as that stored in step 1545 above. Referring to FIG. 8B, row 856, the configuration manager populates column 864 with the node hop initiating port information, populates column 870 with the node hop recipient port information, and adds the node hop latency time to the latency time already stored in column 861.

At this point, the entry includes information to connect the sending device over to the destination node. Next, the configuration manager identifies the node hop recipient device in the destination node (step 1555). The configuration manager determines whether the node hop recipient device is the same as the destination device (decision 1560). If the node hop recipient device is the same as the destination device, the configuration manager branches to "Yes" branch 1562 bypassing steps 1570 and 1575 because the indirect connection entry is complete. On the other hand, if the node hop recipient device is not the same as the destination device, the configuration manager branches to "No" branch 1568.

At step 1570, the configuration manager identifies a direct connection entry that connects the node hop recipient device with the destination device. Referring to FIG. 6B, device 1 450 is the destination device and device 0 440 is the node hop recipient device. In the example shown in FIG. 6B, the configuration manager identifies direct connection 520 as the direct connection entry that connects the node hop recipient device with the destination device. The configuration manager adds the inter-destination node direct connection information to the new entry at step 1575, which includes adding the direct connection's latency time to any latency time already stored in the connection entry, such as those stored in steps 1545 and 1550 above. Referring to FIG. 8B, row 856, the configuration manager populates column 872 with port information that connects the node hop recipient device to the destination device. Processing returns at 1580.

FIG. 16 is a flowchart showing steps taken in a configuration manager configuring registers after identifying device connections and latency times based upon a direct connection discovery process. Processing commences at 1600, whereupon the configuration manager selects a first device at step 1610. At step 1620, the configuration manager retrieves connection entries that correspond to the selected device from connection store 370. Next, the configuration manager uses the connection entries to identify connections between devices and sets the selected device's link connection registers accordingly (step 1630). The configuration manager proceeds to set node identifier/device identifier connection registers for the selected device (step 1640), as well as sets multi-hop connection registers if the connection is an indirect connection (step 1650). The configuration manager then sets the device's connection (link) width registers at step 1660 as well as sets the device's aggregation link registers if applicable (step 1670). At step 1675, the configuration manager sets the device's latency registers, which include direct connection latency times and indirect latency times if applicable.

The configuration manager determines whether there are more devices to select and configure (decision 1680). If there are more devices to configure, the configuration manager branches to "Yes" branch 1682, which loops back to select (step 1685) and configure the next device. This looping continues until there are no more devices in which to configure, at which point the configuration manager branches to "No" branch 1688 whereupon processing returns at 1690.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
identifying, by a configuration manager, a first device, a second device, and a third device within a simulated system, wherein each of the devices within the simulated system includes an inbound port and an outbound port, and wherein the configuration manager is separate from the first device, the second device, and the third device;
injecting, by the configuration manager, a first simulation only packet at a first outbound time on the first device's outbound port;
detecting, by the configuration manager at a first inbound time, the first simulation only packet on the second device's inbound port;
in response to detecting the first simulation only packet on the second device's inbound port, creating, by the configuration manager, a first direct connection entry that identifies the first device and the second device, and includes a first latency time that is the difference between the first outbound time and the first inbound time;
injecting, by the configuration manager, a second simulation only packet at a second outbound time on the second device's outbound port;
detecting, by the configuration manager at a second inbound time, the second simulation only packet time on the third device's inbound port;
in response to detecting the second simulation only packet on the third device's inbound port, creating, by the configuration manager, a second direct connection entry that identifies the second device and the third device, and includes a second latency time that is the difference between the second outbound time and the second inbound time;
determining that a third direct connection entry fails to exist that identifies the first device and the third device;
in response to determining that the third direct connection entry fails to exist:
creating an indirect connection entry based upon the first direct connection entry and the second direct connection entry that identifies the first device, the second device, and the third device;
computing an indirect latency time by adding the first latency time to the second latency time; and
including the indirect latency time in the indirect connection entry;
configuring, by the configuration manager, one or more first device configuration registers and configuring one or more second device configuration registers based upon the first latency time, wherein the first device configuration registers correspond to the first device and the second device configuration registers correspond to the second device; and
configuring, by the configuration manager, one or more of the first device configuration registers, one or more of the second device configuration registers, and one or more third device configuration registers based upon the second latency time and the indirect latency time, the one or more third configuration registers corresponding to the third device.

2. The method of claim 1 further comprising:
detecting, by the configuration manager at the first outbound time, the first simulation only packet on the first device's outbound port;
creating, by the configuration manager, an outbound connection entry that identifies the first device's outbound port and includes the first outbound time in response to detecting the first simulation only packet at the first outbound time on the first device's outbound port;
in response to detecting the first simulation only packet at the first inbound time on the second device's inbound port, creating, by the configuration manager, an inbound connection entry that identifies the second device's inbound port and includes the first inbound time; and
utilizing, by the configuration manager, the outbound connection entry and the inbound connection entry to compute the first latency time.

3. The method of claim 1 wherein the simulation only packet includes the first outbound time, the method further comprising:
after detecting the first simulation only packet on the second device's inbound port, extracting, by the configuration manager, the first outbound time from the first simulation only packet; and
creating, by the configuration manager, an inbound connection entry that includes the first device's outbound port information, the second device's inbound port information, the extracted first outbound time, and the first inbound time.

4. The method of claim 1 further comprising:
utilizing the first latency time to create an expected simulation result;
invoking a simulation;
comparing results from the invoked simulation with the expect simulation results; and
based upon the comparing, creating an error message based upon the results from the simulation not matching the expected simulation results.

5. The method of claim 1 wherein the first outbound time and the first inbound time correspond to simulation clock cycles of the simulated system.

6. A computer program product stored in a non-transitory computer readable storage media, comprising functional descriptive material that, when executed by an information handling system, causes the information handling system to perform actions that include:
identifying a first device, a second device and a third device within a simulated system, wherein each of the devices within the simulated system includes an inbound port and an outbound port, and wherein the configuration manager is separate from the first device, the second device and the third device;
injecting a first simulation only packet at a first outbound time on the first device's outbound port;
detecting, at a first inbound time, the first simulation only packet on the second device's inbound port;
in response to detecting the first simulation only packet on the second device's inbound port, creating a first direct connection entry that identifies the first device and the second device and includes a first latency time that is the difference between the first outbound time and the first inbound time;
injecting a second simulation only packet at a second outbound time on the second device's outbound port;
detecting, at a second inbound time, the second simulation only packet time on the third device's inbound port;
in response to detecting the second simulation only packet on the third device's inbound port, creating a second direct connection entry that identifies the second device and the third device, and includes a second latency time that is the difference between the second outbound time and the second inbound time;
determining that a third direct connection entry fails to exist that identifies the first device and the third device;
in response to determining that the third direct connection entry fails to exist:
creating an indirect connection entry based upon the first direct connection entry and the second direct connection entry that identifies the first device, the second device, and the third device;
computing an indirect latency time by adding the first latency time to the second latency time; and
including the indirect latency time in the indirect connection entry;
configuring one or more first device configuration registers and configuring one or more second device configuration registers based upon the first latency time, wherein the first device configuration registers correspond to the first device and the second device configuration registers correspond to the second device; and
configuring one or more of the first device configuration registers, one or more of the second device configuration registers, and one or more third device configuration registers based upon the second latency time and the indirect latency time, the one or more third configuration registers corresponding to the third device.

7. The computer program product of claim 6 wherein the information handling system further performs actions that include:
detecting, at the first outbound time, the first simulation only packet on the first device's outbound port;
creating an outbound connection entry that identifies the first device's outbound port and includes the first outbound time in response to detecting the first simulation only packet at the first outbound time on the first device's outbound port;
in response to detecting the first simulation only packet at the first inbound time on the second device's inbound port, creating an inbound connection entry that identifies the second device's inbound port and includes the first inbound time; and
utilizing the outbound connection entry and the inbound connection entry to compute of the first latency time.

8. The computer program product of claim 6 wherein the simulation only packet includes the first outbound time, the information handling system further performing actions that include:
after detecting the first simulation only packet on the second device's inbound port, extracting the first outbound time from the first simulation only packet; and
creating an inbound connection entry that includes the first device's outbound port information, the second device's inbound port information, the extracted first outbound time, and the first inbound time.

9. The computer program product of claim 6 wherein the information handling system further performs actions that include:
utilizing the first latency time to create an expected simulation result;
invoking a simulation;
comparing results from the invoked simulation with the expect simulation results; and
based upon the comparing, creating an error message based upon the results from the simulation not matching the expected simulation results.

10. The computer program product of claim 6 wherein the first outbound time and the first inbound time correspond to simulation clock cycles of the simulated system.

11. An information handling system comprising:
one or more processors;
a memory coupled to at least one of the processors;
a nonvolatile storage area coupled to at least one of the processors;
a set of instructions stored in the memory and executed by at least one of the processors in order to perform actions of:
identifying a first device, a second device, and a third device within a simulated system, wherein each of the devices within the simulated system includes an inbound port and an outbound port, and wherein the execution of the set of instructions is separate from the first device, the second device, and the third device;
injecting a first simulation only packet at a first outbound time on the first device's outbound port;
detecting, at a first inbound time, the first simulation only packet on the second device's inbound port;
in response to detecting the first simulation only packet on the second device's inbound port, creating a first direct connection entry that identifies the first device and the second device, and includes a first latency time that is the difference between the first outbound time and the first inbound time;

injecting a second simulation only packet at a second outbound time on the second device's outbound port;

detecting, at a second inbound time, the second simulation only packet time on the third device's inbound port;

in response to detecting the second simulation only packet on the third device's inbound port, creating a second direct connection entry that identifies the second device and the third device, and includes a second latency time that is the difference between the second outbound time and the second inbound time;

determining that a third direct connection entry fails to exist that identifies the first device and the third device;

in response to determining that the third direct connection entry fails to exist:
  creating an indirect connection entry based upon the first direct connection entry and the second direct connection entry that identifies the first device, the second device, and the third device;
  computing an indirect latency time by adding the first latency time to the second latency time; and
  including the indirect latency time in the indirect connection entry;

configuring one or more first device configuration registers and configuring one or more second device configuration registers based upon the first latency time, wherein the first device configuration registers correspond to the first device and the second device configuration registers correspond to the second device; and configuring one or more of the first device configuration registers, one or more of the second device configuration registers, and one or more third device configuration registers based upon the second latency time and the indirect latency time, the one or more third configuration registers corresponding to the third device.

12. The information handling system of claim 11 wherein the set of instructions further performs actions that include:
  detecting at the first outbound time, the first simulation only packet on the first device's outbound port;
  creating an outbound connection entry that identifies the first device's outbound port and includes the first outbound time in response to detecting the first simulation only packet at the first outbound time on the first device's outbound port;
  in response to detecting the first simulation only packet at the first inbound time on the second device's inbound port, creating an inbound connection entry that identifies the second device's inbound port and includes the first inbound time; and
  utilizing the outbound connection entry and the inbound connection entry to compute the first latency time.

13. The information handling system of claim 11 wherein the simulation only packet includes the first outbound time, the set of instructions further performing actions that include:
  after detecting the first simulation only packet on the second device's inbound port, extracting the first outbound time from the first simulation only packet; and
  creating an inbound connection entry that includes the first device's outbound port information, the second device's inbound port information, the extracted first outbound time, and the first inbound time.

14. The information handling system of claim 11 wherein the set of instructions further performs actions that include:
  utilizing the first latency time to create an expected simulation result;
  invoking a simulation;
  comparing results from the invoked simulation with the expect simulation results; and
  based upon the comparing, creating an error message based upon the results from the simulation not matching the expected simulation results.

* * * * *